United States Patent [19]

Fujita et al.

[11] 4,358,526

[45] Nov. 9, 1982

[54] PHOTOGRAPHIC LIGHT-SENSITIVE SHEET FOR THE COLOR DIFFUSION TRANSFER PROCESS

[75] Inventors: Shinsaku Fujita; Isamu Itoh; Shigetoshi Ono; Tooru Harada; Yoshinobu Yoshida, all of Minami-ashigara, Japan

[73] Assignee: Fuji Photo Film Co., Ltd., Kanagawa, Japan

[21] Appl. No.: 293,897

[22] Filed: Aug. 18, 1981

Related U.S. Application Data

[63] Continuation of Ser. No. 64,606, Aug. 7, 1979, abandoned.

[30] Foreign Application Priority Data

Aug. 7, 1978 [JP] Japan ................... 53-96449

[51] Int. Cl.$^3$ .................. G03C 1/40; G03C 7/00; G03C 1/10
[52] U.S. Cl. .................. 430/223; 430/222; 430/225; 430/226; 430/562
[58] Field of Search ............... 430/222, 223, 225, 226, 430/562

[56] References Cited

U.S. PATENT DOCUMENTS 3,932,380 1/1976 Krutak et al. ............ 430/223
4,268,606 5/1981 Haase et al. ............. 430/223
4,268,624 5/1981 Fujita et al. ............. 430/223

Primary Examiner—Richard L. Schilling
Attorney, Agent, or Firm—Sughrue, Mion, Zinn, Macpeak, and Seas

[57] ABSTRACT

A photographic light-sensitive sheet for the color diffusion transfer process which comprises a support having thereon at least one light-sensitive silver halide emulsion layer having associated therewith a compound represented by the following general formula (I):

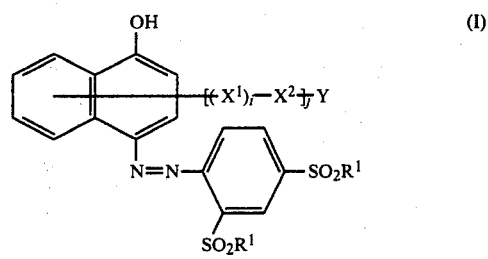

wherein $X^1$ represents —J—$NR^2$— or —$NR^2$—J— wherein $R^2$ represents a hydrogen atom or an alkyl group, and J represents —$SO_2$— or —CO—; $R^1$ represents an alkyl group; $X^2$ represents —$R^3$—(L)$_k$—($R^4$)$_l$ wherein $R^3$ and $R^4$, which may be the same or different, each represents an alkylene group, a substituted alkylene group, a phenylene group or a substituted phenylene group, L represents —O—, —CO—, —$SO_2NH$—, —CONH—, —$NHSO_2$—, —NHCO—, —$SO_2$— or —SO—, k represents 0 or 1, and l represents 1 when k is 1, or 1 or 0 when k is 0, provided that when $X^2$ bonds to $X^1$, $X^1$ bonds to $R^3$; i and j each represents 0 or 1; and Y represents a moiety which provides, as a result of development processing under alkaline conditions, an azo dye compound having a different diffusibility from that of the azo dye image-forming compound represented by the formula (I).

22 Claims, No Drawings

PHOTOGRAPHIC LIGHT-SENSITIVE SHEET FOR THE COLOR DIFFUSION TRANSFER PROCESS

This is a continuation of application Ser. No. 64,606, filed Aug. 7, 1979, now abandoned.

BACKGROUND OF THE INVENTION

1. Field of the Invention

The present invention relates to a photographic light-sensitive sheet for the color diffusion transfer process and, more particularly, to a silver halide photographic light-sensitive sheet for the color diffusion transfer process which provides a magenta color image whose color reproducibility and hue are improved.

2. Description of the Prior Art

It has been well known in the field of the photographic color diffusion transfer process that using an azo dye image-forming compound which provides an azo dye compound having a different diffusibility from that of the azo dye image-forming compound as a result of development under alkaline conditions, the azo dye compound or the azo dye image-forming compound is subjected to transfer to an image-receiving layer in which a transferred dye image is formed.

Examples of dye image-forming compounds which release magenta dyes are described in U.S. Pat. Nos. 3,932,380 and 3,931,144, etc. However, technical problems are encountered, using these magenta dye releasing dye image-forming compounds specifically described in such prior art, in that the transferred images have insufficient stability. For example, the light fastness of the images is not adequate and the images fade to a large extent even in a dark place. Also, the transfer of the dye compound is not adequate.

For instance, with respect to the fading-in-dark of transferred dye images, it has been known that when a polymer acid (such as polyacrylic acid, a copolymer of acrylic acid and butyl acrylate, etc.), as disclosed in U.S. Pat. No. 3,362,819 hereinafter described, is used in a neutralizing layer, unreacted monomer (such as acrylic acid, butyl acrylate, etc.) remaining in the polymer adversely influences the fading-in-dark of the transferred dye images. It has also been found upon further investigation that unreacted butyl acrylate monomer exceptionally degrades the fading-in-dark of magenta dye images obtained from prior art dye image-forming compounds such as described in U.S. Pat. No. 3,932,380. However, it is extremely difficult from a technical standpoint to limit the amount of unreacted monomer during the synthesis of polymer acid for a neutralizing layer to an extent that it does not adversely influence the fastness of the images. Therefore, it has been desired to develop a dye image-forming compound which releases a dye compound which is less reactive to such a monomer.

SUMMARY OF THE INVENTION

A first object of the present invention is to provide a photographic light-sensitive sheet for the color diffusion transfer process which provides a magenta color image less subject to fading-in-dark.

A second object of the present invention is to provide a photographic light-sensitive sheet for the color diffusion transfer process which provides a transferred image whose color hue is excellent.

A third object of the present invention is to provide a photographic light-sensitive sheet for the color diffusion transfer process in which a magenta dye-releasing dye image-forming compound having less fading-in-dark and an absorption in a shorter wavelength region and a dye-releasing dye image-forming compound having less fading-in dark and an absorption in a longer wavelength region are used in a combination.

A fourth object of the present invention is to provide a photographic light-sensitive sheet for the color diffusion transfer process which provides excellent back color reproduction.

As a result of various investigations into this problem, it has been found that the above-described objects are effectively attained with a photographic light-sensitive sheet with satisfactory photographic properties for the color diffusion transfer process which contains at least one azo dye image-forming compound represented by the following general formula:

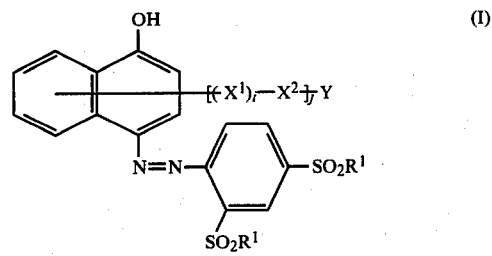

wherein $X^1$ represents $-J-NR^2-$ or $-NR^2-J-$ wherein $R^2$ represents a hydrogen atom or an alkyl group, and J represents $-SO_2-$ or $-CO-$; $R^1$ represents an alkyl group; $X^2$ represents $-R^3-(L)_k(R^4)_j$ wherein $R^3$ and $R^4$, which may be the same or different, each represents an alkylene group which may be substituted or a phenylene group which may be substituted, L represents $-O-$, $-CO-$, $-SO_2NH-$, $-CONH-$, $-NHSO_2-$, $-NHCO-$, $-SO_2-$ or $SO-$, k represents 0 or 1, and when k is 1 l represents 1, and when k is 0 l is 1 or 0, provided that when $X^2$ bonds to $X^1$, $X^1$ bonds to $R^3$; i and j each represents 0 or 1; and Y represents a moiety which provides, as a result of development processing under alkaline conditions, an azo dye compound having a different diffusibility from that of the azo dye image-forming compound represented by the formula (I).

DETAILED DESCRIPTION OF THE INVENTION

The alkyl group represented by $R^1$ can be a straight chain, branched chain or cyclic alkyl group. The alkyl group represented by $R^2$ can be a straight chain or branched chain alkyl group. The alkyl group represented by $R^1$ or $R^2$ is preferably an alkyl group having 1 to 8 carbon atoms and more preferably 1 to 4 carbon atoms such as a methyl group, an ethyl group, a propyl group, an isopropyl group, a butyl group, etc. The cases where $R^1$ represents a methyl group are particularly preferred.

The alkyl group represented by $R^2$ may be a substituted alkyl group having 1 to 8 carbon atoms and more preferably 1 to 4 carbon atoms in the alkyl moiety. Examples of the substituents in the substituted alkyl group represented by $R^2$ include a straight, branched or cyclic alkoxy group having 1 to 8 carbon atoms (preferably 1 to 4 carbon atoms), etc.

The alkylene group represented by $R^3$ or $R^4$ can be a straight chain or branched chain and may be substituted, and is preferably an alkylene group having 1 to 8 carbon atoms, more preferably 1 to 4 carbon atoms. The substituted alkylene group represented by $R^3$ or $R^4$ is preferably a substituted alkylene group having 1 to 8 carbon atoms (more preferably 1 to 4 carbon atoms) in the alkylene moiety and is substituted with a cyano group, a straight, branched or cyclic alkoxy group having 1 to 8 and preferably 1 to 4 carbon atoms, a hydroxy group, a carboxy group or a sulfo group, etc.

The phenylene group represented by $R^3$ or $R^4$ may be substituted or unsubstituted. Examples of the substituents in the substituted phenylene group represented by $R^3$ or $R^4$ include a straight, branched or cyclic alkoxy group having 1 to 8 and preferably 1 to 4 carbon atoms (including a substituted alkoxy group), a halogen atom, a straight, branched or cyclic alkyl group having 1 to 8 and preferably 1 to 4 carbon atoms (including a substituted alkyl group), a hydroxy group, a carboxy group, a sulfo group, a sulfamoyl group, etc.

As the compounds represented by the formula (I), there are illustrated non-diffusible image-forming materials (azo dye-releasing redox compounds) which provide a diffusible dye as a result of self splitting due to oxidation followed by redox reaction in development processing. Examples of Y effective for dye-releasing redox compounds are N-substituted sulfamoyl groups.

For example, Y may be a group represented by the formula (A):

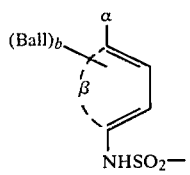
(A)

In the above formula, $\beta$ represents the non-metallic atoms necessary to complete a benzene ring to which a 5- or 6-membered saturated or unsaturated aromatic carbocyclic or saturated or unsaturated aromatic heterocyclic ring may be fused to form, for example, a naphthalene ring, a quinoline ring, a 5,6,7,8-tetrahydronaphthalene ring, a chroman ring, etc. Further, the benzene ring or the fused carbocyclic or heterocyclic ring may be substituted with substituents such as a halogen atom, an alkyl group having 1 to 8 carbon atoms and preferably 1 to 4 carbon atoms, an alkoxy group having 1 to 8 carbon atoms and preferably 1 to 4 carbon atoms, an aryl group having 6 to 12 carbon atoms and preferably 6 to 9 carbon atoms, an aryloxy group having 6 to 12 carbon atoms and preferably 6 to 9 carbon atoms, a nitro group, an amino group, an alkylamino group having 1 to 8 carbon atoms and preferably 1 to 4 carbon atoms, an arylamino group having 6 to 12 carbon atoms and preferably 6 to 9 carbon atoms, a cyano group, an alkylmercapto group having 1 to 8 carbon atoms and preferably 1 to 4 carbon atoms, a keto group, a carboalkoxy group having 2 to 10 carbon atoms and preferably 2 to 6 carbon atoms, a heterocyclic ring and preferably a 5- or 6-membered heterocyclic ring having N, O and S as a hetero atom, etc., wherein the alkyl moieties of the aforesaid substituents may be straight chain, branched chain or cyclic and the aryl moieties may be mono or bicyclic.

$\alpha$ represents an —$OG^1$ or —$NHG^2$ group, wherein $G^1$ represents a hydrogen atom or a group capable of forming a hydroxyl group by hydrolysis, and preferably represents a hydrogen atom,

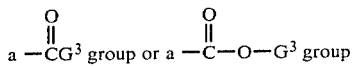

wherein $G^3$ represents an alkyl group, in particular, a straight, branched or cyclic alkyl group having 1 to 18 carbon atoms (e.g., a methyl group, an ethyl group, a propyl group, etc.), a halogen-substituted straight, branched or cyclic alkyl group having 1 to 18 carbon atoms (e.g., a chloromethyl group, a trifluoromethyl group, etc.), a phenyl group or a substituted phenyl group, and $G^2$ represents a hydrogen atom, a straight, branched or cyclic alkyl group having 1 to 22 carbon atoms or a hydrolyzable group (i.e., a group capable of forming an amino group by hydrolysis). Representative examples of suitable substituents for the phenyl group include a cyano group, a $C_1$-$C_4$ alkylsulfonyl group, a nitro group, a halogen atom such as a chlorine atom, a $C_1$-$C_4$ alkyl group, an acetamido group, a $C_1$-$C_4$ alkoxy group, etc. Preferred examples of the hydrolyzable group represented by $G^2$ are

—$SO_2G^5$ or —$SOG^5$, wherein $G^4$ represents a straight, branched or cyclic alkyl group having 1 to 8 and preferably 1 to 4 carbon atoms (e.g., a methyl group); a halogen-substituted straight, branched or cyclic alkyl group having 1 to 8 and preferably 1 to 4 carbon atoms (e.g., mono-, di or trichloromethyl group or a trifluoromethyl group); an alkylcarbonyl group wherein alkyl moiety is a straight chain, branched chain or cyclic alkyl group having 1 to 8 and preferably 1 to 4 carbon atoms (e.g., methylcarbonyl, ethylcarbonyl, propylcarbonyl, isopropylcarbonyl, butylcarbonyl, t-butylcarbonyl, etc.); a straight chain, branched chain or cyclic alkoxy group having 1 to 7 and preferably 1 to 4 carbon atoms (e.g., methoxy, ethoxy, propoxy, butoxy, etc.); a substituted phenyl group (e.g., a nitrophenyl group or a cyanophenyl group); a phenyloxy group unsubstituted or substituted by a $C_1$-$C_5$ alkyl group or a halogen atom; a carboxyl group; straight chain, branched chain or cyclic alkoxycarbonyl group having 2 to 9 and preferably 2 to 5 carbon atoms (e.g., methoxycarbonyl, ethoxycarbonyl, propoxycarbonyl, butoxycarbonyl, etc.); an aryloxycarbonyl group wherein aryloxy moiety is monocyclic or bicyclic aryloxy group having 6 to 12 and preferably 6 to 9 carbon atoms (e.g., phenoxycarbonyl, p-methoxyphenoxycarbonyl, etc.); an alkylsulfonylethoxy group wherein alkyl moiety is straight chain, branched chain or cyclic alkyl group having 1 to 8 and preferably 1 to 4 carbon atoms; an arylsulfonylethoxy group wherein aryl moiety is monocyclic or bicyclic aryl group having 6 to 12 and preferably 6 to 9 carbon atoms, and $G^5$ represents a substituted or unsubstituted alkyl or aryl group where the alkyl group has 1 to 8 and preferably 1 to 4 carbon atoms wherein alkyl group may be straight chain, branched chain or cyclic and may be substituted by, for example, halogen, alkoxy, etc.; and the aryl group has 6 to 12 and preferably 6 to 9 carbon atoms wherein aryl group may be monocyclic or bicyclic and may be substituted by nitro, cyano, alkyl, alkoxy, halogen, etc.

Further, b represents 1 to 2, preferably 1, when α represents a group represented by —OG¹ or —NHG² wherein G² represents a hydrogen atom, an alkyl group having 1 to 8 carbon atoms or a hydrolyzable group. b represents 0 or 1 when α represents —NHG² wherein G² represents an alkyl group having about 9 to 22 carbon atoms and making the compound of the general formula (A) immobile and non-diffusible. Ball represents a ballast group which will be described in detail hereinafter.

Specific examples of this type Y are described in U.S. Published Application No. B 351,673, U.S. Pat. Nos. 4,076,529, 3,928,312 and 3,993,638.

As another example of Y there is illustrated a group represented by the following formula (B):

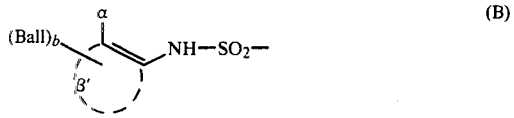

In the above formula, Ball, α and b are the same as defined in formula (A), β' represents the atoms necessary to form a benzene ring to which a carbocyclic or a heterocyclic saturated, unsaturated or aromatic ring may further be fused to form a naphthalene ring, a quinoline ring, a 5,6,7,8-tetrahydronaphthalene ring, a chroman ring, etc. The above-described various rings may be further substituted by a halogen atom, alkyl group having 1 to 8 and preferably 1 to 4 carbon atoms which may be straight chain, branched chain or cyclic; an alkoxy group having 1 to 8 and preferably 1 to 4 carbon atoms which may be straight chain, branched chain or cyclic; an aryl group having 6 to 12 and preferably 6 to 9 carbon atoms which may be monocyclic or bicyclic; an aryloxy group having 6 to 12 and preferably 6 to 9 carbon atoms which may be monocyclic or bicyclic; a nitro group; an amino group; an alkylamino group in which the alkyl moiety has 1 to 8 and preferably 1 to 4 carbon atoms and is straight, branched or cyclic; an arylamino group in which the aryl moiety has 6 to 12 and preferably 6 to 9 carbon atoms and is monocyclic or bicyclic; an amido group; a cyano group; an alkylmercapto group in which the alkyl moiety has 1 to 8 and preferably 1 to 4 carbon atoms and is straight, branched or cyclic; a keto group; a carboalkoxy group having 2 to 9 and preferably 2 to 5 carbon atoms and which is straight, branched or cyclic; a 5- or 6-membered heterocyclic ring where the hetero atom(s) may be any of O, S or N, or the like. Specific examples of this type Y are described in U.S. Pat. Nos. 4,053,312 and 4,055,428.

A further example of Y is a group represented by the general formula (C):

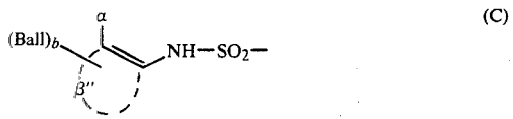

In the above formula, Ball, α and b are the same as defined in the formula (A), and β″ represents the atoms necessary to form a 5- or 6-membered saturated or unsaturated N-containing heterocyclic ring such as a pyrazole ring, a pyridine ring, etc., to which a carbocyclic ring or an N, S or O-containing heterocyclic ring may further be fused. The above-described rings may be substituted by the same substituents as those for the rings described in the formula (B). Specific examples of this type Y are described in Japanese Patent Application (OPI) No. 104343/1976 (The term "OPI" as used herein refers to a "published unexamined Japanese patent application") and Belgian Pat. No. 838,062.

A still further example of Y is illustrated by the formula (D):

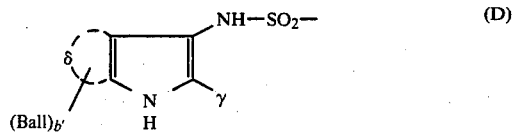

In the above formula, γ preferably represents a hydrogen atom, a $C_1$-$C_{22}$ straight, branched or cyclic alkyl group, a $C_6$-$C_{24}$ mono- or bicyclic aryl group or an N, S or O containing 5- or 6-membered heterocyclic ring which may be unsubstituted or substituted (Examples of the substituent for the alkyl group include alkoxy, phenoxy, etc. Examples of the substituent for the aryl group include alkoxy, alkyl, nitro, halogen, cyano, etc.); or a —CO—G⁶ group wherein G⁶ represents —OG⁷, —SG⁷ or

and G⁷ represents a hydrogen atom, a straight chain, branched chain or cyclic alkyl group having 1 to 22 carbon atoms wherein said alkyl group may be unsubstituted or substituted and examples of the substituent include alkoxy, phenoxy, etc.; or an aryl group having 6 to 24 carbon atoms and which may be monocyclic or bicyclic and substituted or unsubstituted and which may be substituted, for example, by an alkoxy group, an alkyl group, a nitro group, a halogen atom, a cyano group, etc.; G⁸ has the same definition as G⁷ or may be an acyl group derived from a $C_2$-$C_{22}$ aliphatic or a $C_7$-$C_{23}$ aromatic carboxylic acid or from a sulfonic acid, and G⁹ represents a hydrogen atom or a substituted or unsubstituted alkyl group where the alkyl group may contain 1 to 22 carbon atoms and be straight, branched or cyclic and may be substituted by, for example, a $C_1$-$C_{20}$ alkoxy group, a phenoxy group, a cyano group, a halogen atom, etc., δ represents the atoms necessary to complete a fused benzene ring which ring may have one or more substituents. Ball is the same as defined in the formula (A). b' represents 0 or 1 when γ represents an above-mentioned group having more than 8 carbon atoms. b' represents 1 or 2 when γ represents an above-mentioned group having 1 to 8 carbon atoms. Substituents for the ring δ may be the same as defined for the rings in formulae (A) and (B), e.g., an alkoxy group, an alkyl group, a halogen atom, etc. Specific examples of this type Y are described in Japanese Patent Application (OPI) Nos. 104343/1976 and 46730/1978.

Still a further example of Y is a group represented by the formula (E):

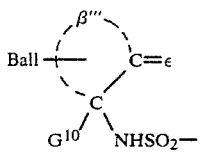

In the above formula, Ball is the same as defined in the formula (A), ε represents an oxygen atom or =NG" where G" represents a hydroxyl group or an amino group which may be substituted as described below. The group =NG" is derived from a carbonyl reagent of $H_2N-G"$. Examples of the compound of $H_2N-G"$ are hydroxylamines, hydrazines, semicarbazides, thiosemicarbazides, etc. The hydrazines represented by $H_2N-G"$ are, for example, hydrazine, phenylhydrazine, substituted phenylhydrazine having in the phenyl moiety a substituent or substituents such as a straight, branched or cyclic alkyl group having 1 to 8 and preferably 1 to 4 carbon atoms, a straight, branched or cyclic alkoxy group having 1 to 8 and preferably 1 to 4 carbon atoms, a carboalkoxy group having 2 to 9 and preferably 2 to 5 carbon atoms, a halogen atom (e.g., Cl, Br, F), etc., isonicotinic acid hydrazine, etc. As the semicarbazides represented by $H_2N-G"$ there are illustrated phenylsemicarbazide or substituted phenylsemicarbazide substituted by a $C_1-C_8$ and preferably $C_1-C_4$ alkyl group, a $C_1-C_5$ and preferably $C_1-C_4$ alkoxy group, a $C_2-C_9$ and preferably $C_2-C_5$ carboalkoxy group, a halogen atom (e.g., Cl, Br, F), etc. As the thiosemicarbazides represented by $H_2N-G"$ there are illustrated the same derivatives as with semicarbazides.

β''' in the formula represents a 5-, 6- or 7-membered saturated or unsaturated non-aromatic carbocyclic ring. To be specific, there are illustrated, for example, cyclopentanone, cyclohexanone, cyclohexenone, cyclopentenone, cycloheptanone, cycloheptenone, etc. These 5- to 7-membered non-aromatic carbocyclic rings may be fused to other rings at a suitable position to form a fused ring system. As the other ring, various 5- or 6-membered rings may be used regardless of whether they show aromaticity or not or whether they are carbocyclic or heterocyclic rings. However, in the case of a fused ring being formed, fused systems wherein benzene and the above-described 5- to 7-membered non-aromatic hydrocarbon ring are fused to each other such as indanone, benzcyclohexenone, benzcycloheptenone, etc., are preferable in the present invention.

The above-described 5- to 7-membered non-aromatic carbocyclic rings or the above-described fused rings may be substituted by one or more of a $C_1-C_8$ and preferably $C_1-C_4$ alkyl group, a $C_6-C_{12}$ and preferably $C_6-C_9$ aryl group, a $C_1-C_8$ and preferably $C_1-C_4$ alkoxy group, a $C_6-C_{12}$ and preferably $C_6-C_9$ alkoxy group, a $C_2-C_9$ and preferably $C_2-C_5$ alkylcarbonyl group, a $C_7-C_{13}$ and preferably $C_7-C_{10}$ arylcarbonyl group, a $C_1-C_8$ and preferably $C_1-C_4$ alkylsulfonyl group, a $C_6-C_{12}$ and preferably $C_6-C_9$ arylsulfonyl group, a $C_1-C_8$ and preferably $C_1-C_4$ alkylamino group, a $C_6-C_{12}$ and preferably $C_6-C_9$ arylamino group, a $C_2-C_9$ and preferably $C_2-C_5$ alkylamido group, a $C_7-C_{13}$ and preferably $C_7-C_{10}$ arylamido group, a $C_1-C_8$ and preferably $C_1-C_4$ alkylmercapto group, a $C_2-C_9$ and preferably $C_2-C_5$ alkoxycarbonyl group, a halogen atom (e.g., F, Cl, Br), a nitro group, an amino group, a cyano group, an amido group, etc.

$G^{10}$ represents a hydrogen atom, or a halogen atom such as fluorine, chlorine or bromine.

Specific examples of this type Y are described in U.S. Pat. No. 4,149,892.

Still further examples of Y are described in, for example, Japanese Patent Publication Nos. 32129/1973 and 39165/1973, Japanese Patent Application (OPI) No. 64436/1974 and U.S. Pat. No. 3,443,943, etc.

The compounds represented by the formula (I) may be non-diffusible dye image-forming compounds which release a diffusible dye under alkaline conditions through self cyclization or the like but, when reacted with the oxidation product of a developing agent, do not substantially release the dye. As an example of Y effective for this type compound, there is a group represented by the formula (F):

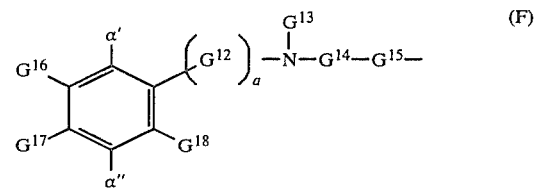

In the above formula, α' represents an oxidizable nucleophilic group such as a hydroxyl group, a primary or secondary amino group, a hydroxyamino group or a sulfonamido group, or the precursor thereof

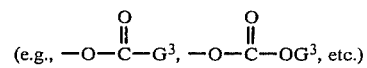

and preferably represents a hydroxyl group.

α" represents a $C_1-C_{22}$ dialkylamino group or any of those groups defined for α', preferably a hydroxyl group. $G^{14}$ represents an electrophilic group such as —CO—, —CS—, etc., preferably —CO—. $G^{15}$ represents an oxygen atom, a sulfur atom, a selenium atom, a nitrogen atom, etc., and when $G^{15}$ represents a nitrogen atom it may be substituted by a hydrogen atom, an unsubstituted or substituted alkyl group having 1 to 10 carbon atoms, or an aryl group having 6 to 20 carbon atoms. Preferably $G^{15}$ is an oxygen atom. $G^{12}$ represents an alkylene group containing 1 to 3 carbon atoms, and a represents 0 or 1, preferably 0. $G^{13}$ is a substituted or unsubstituted straight, branched or cyclic alkyl group containing 1 to 40 carbon atoms or a substituted or unsubstituted mono- or bicyclic aryl group containing 6 to 40 carbon atoms, preferably an alkyl group. $G^{16}$, $G^{17}$ and $G^{18}$ each represents a hydrogen atom, a halogen atom, a carbonyl group, a sulfamyl group, a sulfonamido group, a straight, branched or cyclic alkyloxy group containing 1 to 40 carbon atoms, or may be the same as defined for $G^{13}$ or, when taken together, $G^{16}$ and $G^{17}$ may form a 5- to 7-membered saturated, unsaturated or aromatic ring. Also, G may be

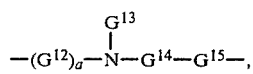

provided that at least one of $G^{13}$, $G^{16}$, $G^{17}$ and $G^{18}$ represents a ballast group.

Specific examples of this type Y are described in Japanese Patent Application (OPI) No. 63618/1976.

As another example of Y there is further illustrated by the formula (G):

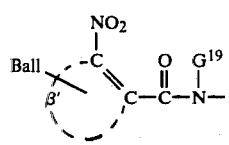

wherein Ball and β' are the same as defined in the formula (B), and G¹⁹ represents a $C_1$–$C_4$ straight or branched alkyl group (including a substituted alkyl group). Specific examples of this type Y are described in Japanese Patent Application (OPI) No. 35533/1978.

As a further example of Y there is further illustrated a group represented by the formula (H):

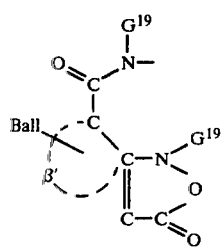

wherein Ball and β' are the same as defined in the formula (B), and G¹⁹ is the same as defined in the formula (G). Specific examples of this type Y are described in Japanese Patent Application (OPI) Nos. 111628/1974 and 4819/1977 and British Pat. No. 1,542,308.

Another type compound represented by the formula (I) is a non-diffusible compound (dye-releasing couplers) which releases a diffusible dye upon coupling reaction with an oxidation product of a color developing agent oxidized by silver halide. As the examples of Y effective for such compounds, the groups described in U.S. Pat. No. 3,227,550 are typical. For example, Y may be represented by the following general formula (J):

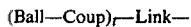

(Ball—Coup)$_t$—Link—  (J)

wherein Coup represents a coupler residue capable of coupling with an oxidation product of a color developing agent, for example, a 5-pyrazolone type coupler residue, a phenol type coupler residye, a naphthol type coupler residue, an indanone type coupler residue or an open chain ketomethylene coupler residue. Ball represents a ballast group. Link represents a group bonded to an active cite of Coup moiety, which bond with Coup moiety will split upon coupling reaction between the dye image-providing material represented by the formula (I) containing the group represented by the formula (J) as Y and an oxidation product of a color developing agent. Examples of Link are an azo group, an azoxy group, —O—, —Hg—, an alkylidene group, —S—, —S—S— or —NHSO$_2$—, and t represents 1 or 2 when Link represents an alkylidene group or represents 1 when Link represents other group described above.

Of the Y groups represented by the formula (J), preferable groups are those wherein Coup represents a phenol type coupler residue, a naphthol type coupler residue or an indanone type coupler residue, and Link represents —NHSO$_2$—.

As still another type compound represented by the formula (I), there is illustrated compounds (dey developing agents) which are initially diffusible under alkaline conditions but, when oxidized through development processing, become non-diffusible. Typical examples of Y effective for this type compound are described in U.S. Pat. No. 2,983,606.

Of the above-described compounds, particularly preferable are dye-releasing redox compounds in which Y is an N-substituted sulfamoyl group. As the N-substituents for the N-substituted sulfamoyl groups, carbocyclic ring groups or heterocyclic ring groups are desirable. As examples of N-carbocyclic ring substituted sulfamoyl groups, those represented by formulae (A) and (B) are particularly preferred. As examples of N-heterocyclic ring substituted sulfamoyl groups, those represented by formulae (C) and (D) are particularly preferred.

As Y, the group represented by the formula (II) is particularly preferred.

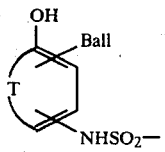

wherein Ball represents a ballast group; T represents an atomic group necessary to complete a benzene ring including a substituted benzene ring or a naphthalene ring including a substituted naphthalene ring; the —NHSO$_2$— group is present at the o- or p-position to the hydroxy group; and when T represents the atoms necessary to complete a naphthalene ring, Ball can be bonded to either of the two rings.

Examples of suitable substituents which can be present on the benzene ring or the naphthalene ring include a straight, branched or cyclic alkyl group (preferably an alkyl group having 1 to 7 carbon atoms, particularly 1 to 4 carbon atoms), a halogen atom (such as a chlorine atom, etc.), etc., or a 5-, 6- or 7-membered heterocyclic ring (where the hetero atoms are O, S or N) or a non-aromatic 5-, 6- or 7-membered carbocyclic ring fused to the benzene ring. These rings may be further substituted.

The ballast group is an organic ballast group capable of rendering the dye image-forming compound non-diffusible during development in an alkaline processing solution and preferably contains a hydrophobic residue having 8 to 32 carbon atoms. This organic ballast group can be bonded to the dye image-forming compound directly or through a linking group, for example, an imino bond, an ether bond, a thioether bond, a carbonamido bond, a sulfonamido bond, a ureido bond, an ester bond, an imido bond, a carbamoyl bond, a sulfamoyl bond, etc., alone or in combination thereof.

Specific examples of ballast groups are illustrated below.

An alkyl group or an alkenyl group (for example, a dodecyl group, an octadecyl group, etc.), an alkoxyalkyl group (for example, a 3-(octyloxy)propyl group, a 3-(2-ethylundecyloxy)propyl group, etc., as described in Japanese Patent Publication No. 27563/1964, etc.), an alkylaryl group (for example, a 4-nonylphenyl group, a 2,4-di-tert-butylphenyl group, etc.), an alkylaryloxyalkyl group (for example, a 2,4-di-tert-pentylphenoxymethyl group, an α-(2,4-di-tert-pentylphenoxy)propyl group, a 1-(3-pentadecylphenoxy)ethyl group, etc.), an acylamidoalkyl group (for example, a group described in U.S. Pat. Nos. 3,337,344 and 3,418,129, a 2-(N-butylhexadecanamido)ethyl group, etc.), an alkoxyaryl or an aryloxyaryl group (for example, a 4-(n-octadecyloxy)-phenyl group, a 4-(4-n-dodecylphenyloxy)phenyl group, etc.), a residue containing both an alkyl or alkenyl long-chain aliphatic group and a water-solubilizing group such as a carboxy group or a sulfo group (for example, a 1-carboxymethyl-2-nonadecenyl group, a 1-sulfoheptadecyl group, etc.), an alkyl group substituted with an ester group (for example, a 1-ethoxycarbonylheptadecyl group, a 2-(n-dodecyloxycarbonyl)ethyl group, etc.), an alkyl group substituted with an aryl group or a heterocyclic group (for example, a 2-[4-(3-methoxycarbonyluneicosanamido)phenyl]ethyl group, a 2-[4-(2-n-octadecylsuccinimido)phenyl]ethyl group, etc.), and an aryl group substituted with an aryloxyalkoxycarbonyl group (for example, a 4-[2-(2,4-di-tert-pentylphenoxy)-2-methylpropyloxycarbonyl]phenyl group, etc.).

Of the above-described organic ballast groups, those bonded to a bridging group as represented by the following general formulae are particularly preferred.

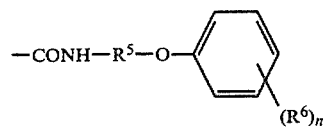
(IIIa)

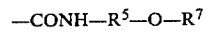
(IIIb)

(IIIc)

(IVa)

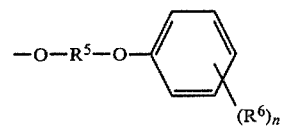
(IVb)

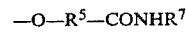
(Va)

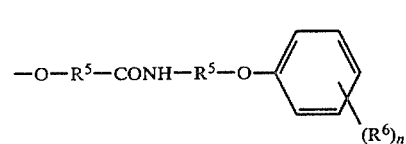
(Vb)

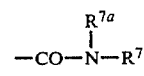
(VI)

wherein $R^5$ represents an alkylene group having 1 to 10 carbon atoms, preferably 1 to 6 carbon atoms (such as a propylene group, a butylene group, etc.); $R^6$ represents a hydrogen atom or an alkyl group having 1 to 10 carbon atoms, preferably 1 to 6 carbon atoms (such as a tert-amyl group, etc.); n represents an integer of 1 to 5 (preferably 1 to 2); $R^7$ represents an alkyl group having 4 to 30 carbon atoms, preferably 10 to 20 carbon atoms (such as a dodecyl group, a tetradecyl group, a hexadecyl group, etc.); and $R^8$ represents an alkyl group having 8 to 30 carbon atoms, preferably 10 to 20 carbon atoms (such as a hexadecyl group, an octadecyl group, etc.), $R^{7a}$ represents an alkyl group having 1 to 30 carbon atoms, preferably 1 to 20 carbon atoms, or a substituted alkyl group having 1 to 30 and preferably 1 to 20 carbon atoms in which the alkyl moiety has one or more carbon atoms, with examples of suitable substituents being one or more of, for example, a carbamoyl group, a cyano group, a halogen atom, etc.

Specific examples of sulfamoyl groups represented by the formula (II) are illustrated below.

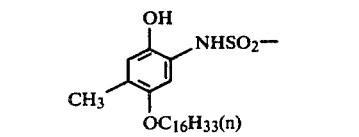

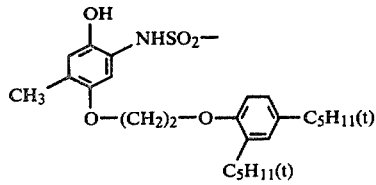

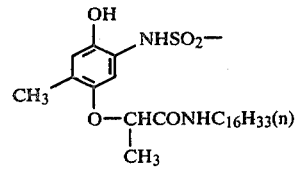

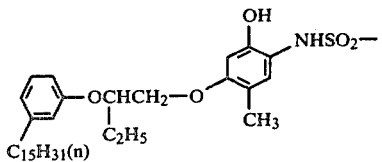

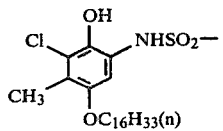

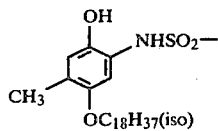

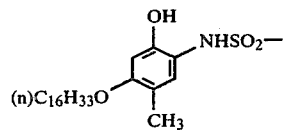

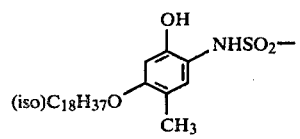

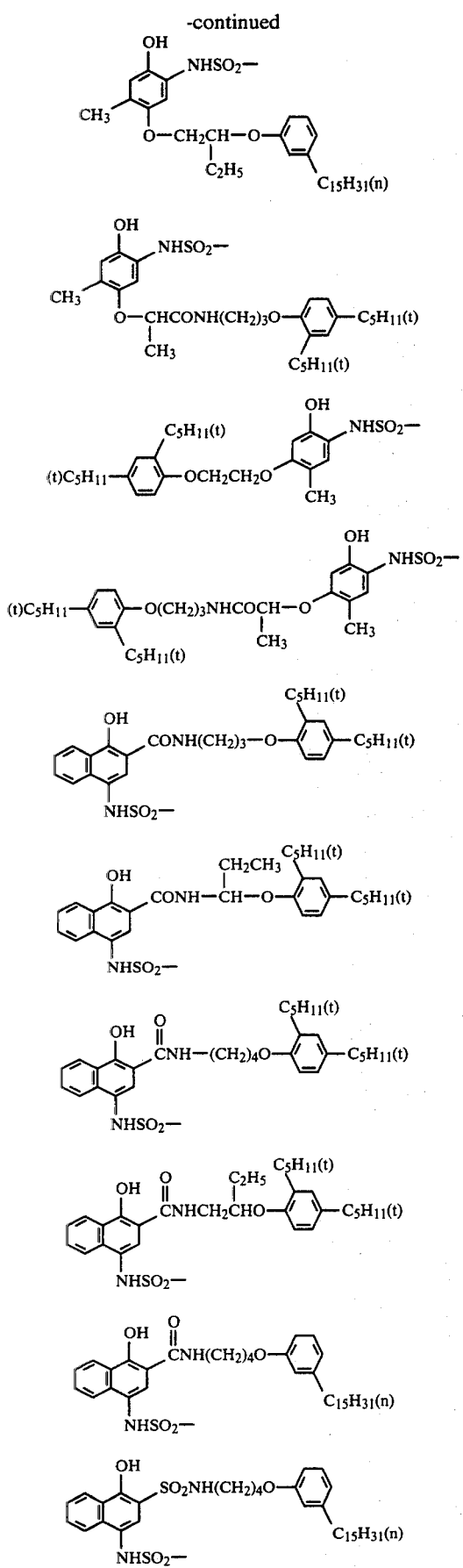
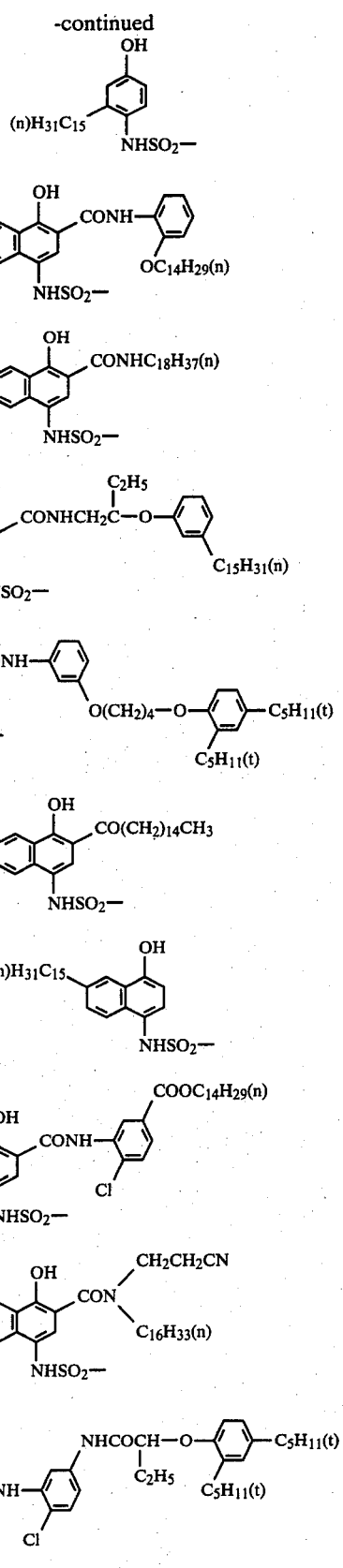
Furthermore, the groups described in *Research Disclosure*, Vol. 130, No. 13024 (February, 1975) are useful for Y.

A more preferred compound according to the present invention is a compound represented by the above-described general formula (I), and in which $X^1$ represents —J—$NR^2$— or —$NR^2$—J— wherein $R^2$ represents a hydrogen atom, and J represents —$SO_2$— or —CO—; $R^1$ represents a straight or branched alkyl group having 1 to 4 carbon atoms; $X^2$ represents —$R^3$—$(L)_k(R^4)_l$ wherein $R^3$ and $R^4$, which may be the same or different, each represents a phenylene group or a phenylene group substituted by, for example, an alkyl, alkoxy, alkoxyalkoxy, cyano, halogen, etc., L represents —O—, —CO—, —$SO_2NH$—, —CONH—, —$NHSO_2$—, —NHCO—, —$SO_2$— or —SO—, k represents 0 or 1; and l represents 1 when k is 1 or l represents 0 or 1 when k is 0; i and j each represents 1; and Y represents a sulfamoyl group represented by the general formula (II).

A particularly preferred compound according to the present invention is a compound represented by the above-described general formula (I), and in which $X^1$ represents —J—$NR^2$— or —$NR^2$—J— wherein $R^2$ represents a hydrogen atom; and J represents —$SO_2$— or —CO—; $R^1$ represents a straight or branched alkyl group having 1 to 4 carbon atoms; $X^2$ represents —$R^3$—$(L)_k(R^4)_l$ wherein $R^3$ represents a phenylene group, $R^4$ represents a phenylene group substituted with $R^9$—O—$R^{10}$—O— wherein $R^9$ represents a straight or branched alkyl group having 1 to 4 carbon atoms, and $R^{10}$ represents an alkylene group having 1 to 4 carbon atoms, L represents —$SO_2NH$—, k represents 1, and l represents 1; i represents 1; j represents 1; and Y represents a sulfamoyl group represented by the general formula (II).

Another particularly preferred compound according to the present invention is a compound represented by the above-described general formula (I), and in which $X^1$ represents —CONH—; $R^1$ represents a straight or branched alkyl group having 1 to 4 carbon atoms; $X^2$ represents —$R^3$—(i.e., k and l each represents 0) and $R^3$ represents a phenylene group or a phenylene group substituted by, for example, an alkyl, alkoxy, alkoxyalkoxy, cyano, halogen, etc.; i and j each represents 1; and Y represents a sulfamoyl group represented by the general formula (II).

While the compounds according to the present invention will be explained using the redox compounds as a representative example for convenience, other types of compounds can be synthesized and employed in a manner similar to these redox compounds.

Specific examples of the compounds according to the present invention are illustrated below. However, the present invention should not be construed as being limited to these specific examples.

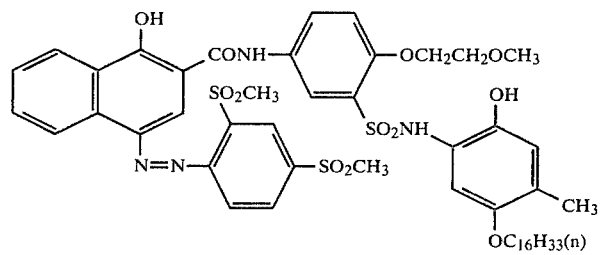

1.

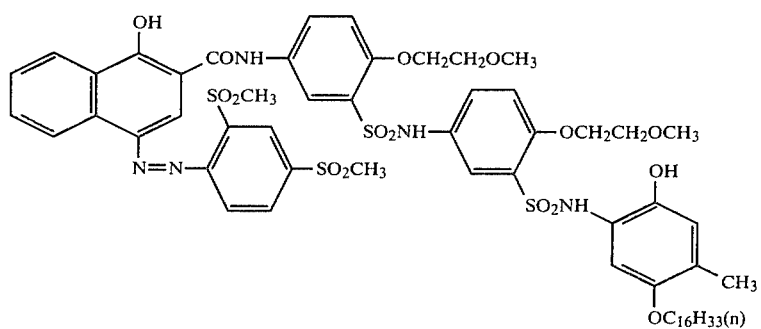

2.

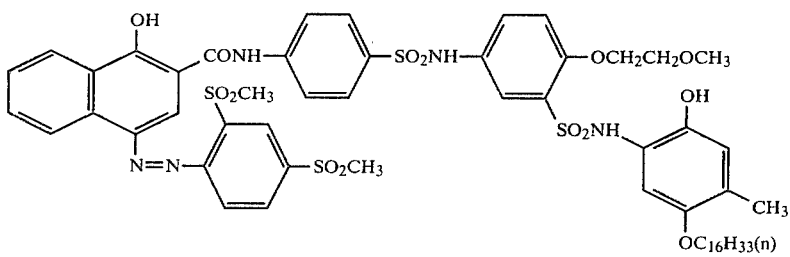

3.

-continued
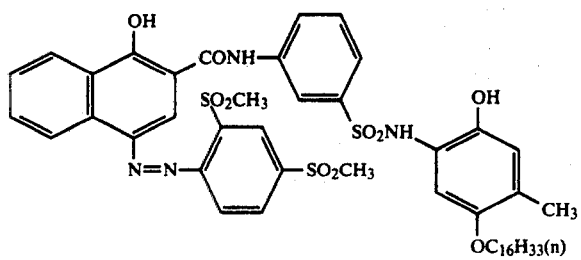
4.
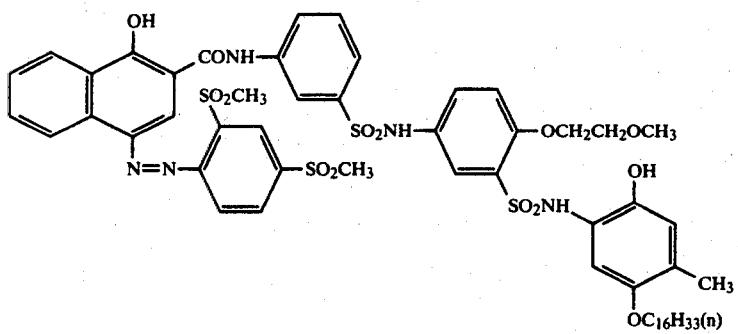
5.
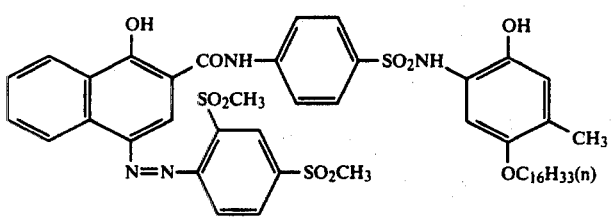
6.
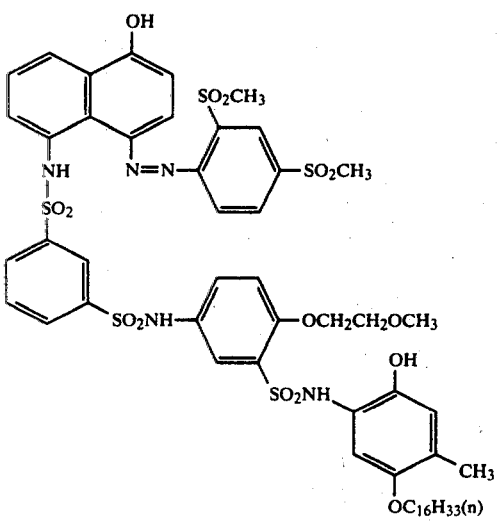
7.
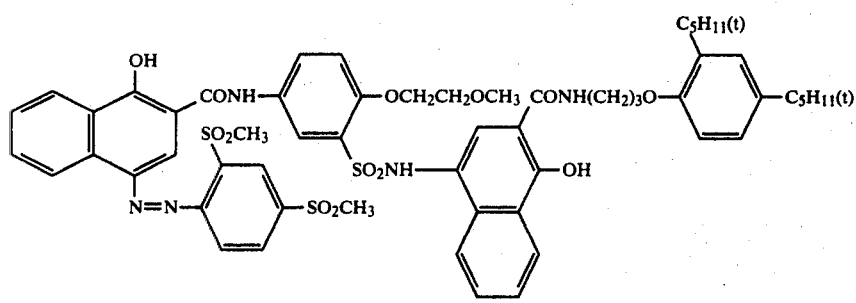
8.
Of the compounds according to the present invention, compounds in which Y represents a group represented by the above-described formulae (A), (B), (C), (D) or (E) release a novel dye compound represented by the following formula (VII):

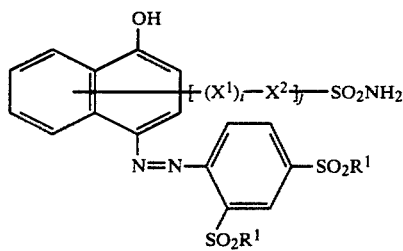

wherein $R^1$, $X^1$, $X^2$, i and j each has the same meaning as defined in the above-described formula (I), when the compounds are oxidized under alkaline conditions.

An example of synthesis method generally used to obtain compounds according to the present invention is a condensation reaction of a sulfonyl halide represented by the formula (VIII) with an amine represented by the formulae (IXa) to (IXe):

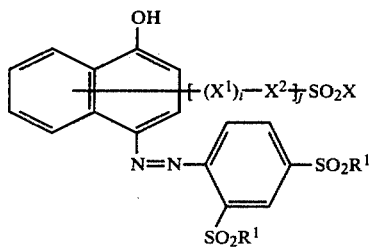

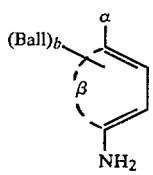

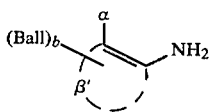

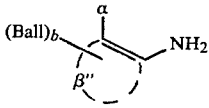

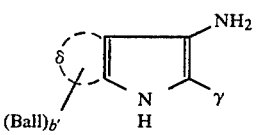

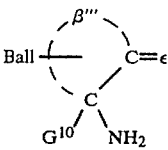

wherein $R^1$, $X^1$, $X^2$, i and j each has the same meaning as defined in the formula (I); X represents a halogen atom, $\alpha$, $\beta$, $\beta'$, $\beta''$, $\beta'''$, $\gamma$, $\delta$, $\epsilon$, $G^{10}$, Ball, b and b' each has the same meaning as defined in the formulae (A) to (E).

Other types of dye image-forming compounds can be also synthesized according to the above-described synthesis method.

Usually, the condensation reaction is preferably carried out in the presence of a basic compound. Examples of suitable basic compounds include a hydroxide of an alkali metal or an alkaline earth metal (for example, sodium hydroxide, potassium hydroxide, barium hydroxide, calcium hydroxide, etc.), an aliphatic amine (for example, triethylamine, etc.), an aromatic amine (for example, N,N-diethylaniline, etc.), a heteroaromatic amine (for example, pyridine, quinoline, $\alpha$-, $\beta$- or $\gamma$-picoline, lutidine, collidine, 4-(N,N-dimethylamino)-pyridine, etc.), or a heterocyclic base (for example, 1,5-diazabicyclo[4,3,0]nonene-5,1,8-diazabicyclo[5,4,-0]undecene-7, etc.). A heteroaromatic amine (preferably pyridine) is particularly preferred of the above-described basic compounds where a compound represented by the formula (VIII) wherein X is a chlorine atom, that is, a sulfonyl chloride is used.

Typical examples of the amines represented by the formula (IXa) are described, for example, in U.S. Published Application No. B 351,673, U.S. Pat. Nos. 4,076,529, 3,928,312, 3,993,638, 3,932,380 and 3,931,144. For the preparation of compounds represented by the formula (IXb) see U.S. Pat. Nos. 4,055,428 and 4,053,312; the formula (IXc) see Belgian Pat. No. 838,062; the formula (IXd) see Japanese Patent Application (OPI) Nos. 104343/76 and 46730/78 and the formula (IXe) see U.S. Pat. No. 4,149,892.

While specific examples of the synthesis of compounds according to the present invention will be illustrated below, compounds other than those specifically described can be easily synthesized according to these synthesis methods.

SYNTHESIS EXAMPLE 1

Synthesis of Compound 1

(1) Synthesis of 2-(N-4-Methoxyethoxy-3-sulfoanilinocarbamoyl)-1-naphthol

A solution containing 13.2 g of 2-phenoxycarbonyl-1-naphthol, 14.2 g of 1-amino-4-methoxyethoxybenzene-3-sulfonic acid, 50 ml of dimethylformamide (DMF) and 6 ml of pyridine was heated at 140° C. with stirring. After stirring for 2 hours, the mixture was cooled to 60° C. and 150 ml of methanol was added thereto. The crystals thus-precipitated were collected by filtration and washed with 120 ml of methanol.

Yield: 8 g; Melting Point: above 200° C.

(2) Synthesis of 2-(N-4-Methoxyethoxy-3-sulfoanilinocarbamoyl)-4-(2,4-dimethanesulfonylphenylazo)-1-naphthol 0.76 g of sodium nitrite was added to 5 ml of concentrated sulfuric acid and the mixture was heated at 70° C. with stirring. After stirring for 30 minutes, the mixture was cooled to 0° C. and a solution mixture of 8 ml of acetic acid and 2 ml of propionic acid was added dropwise at below 5° C. thereto. Then 2.5 g of 1-amino-2,4-dimethanesulfonylbenzene was added to the mixture at 5° C. and the mixture was stirred for 3 hours. After adding 20 ml of ice water, a solution containing 4 g of the naphthol derivative obtained in Step (1) above dissolved in 30 ml of a 2% aqueous sodium hydroxide solution was added dropwise to the mixture and the mixture was stirred at 5° C. for 1 hour. The crystals thus-precipitated were collected by filtration and washed with 30 ml of acetonitrile.

Yield: 6.2 g; Melting Point: above 200° C.

(3) Synthesis of 2-(N-4-Methoxyethoxy-3-chlorosulfonylanilinocarbamoyl)-4-(2,4-dimethanesulfonylphenylazo)-1-naphthol To a solution containing 6 g of the naphthol derivative obtained in Step (2) above, 40 ml of acetonitrile and 6 ml of phosphorous oxychloride, 6 ml of N,N-dimethylacetamide were added dropwise with stirring. The mixture was stirred at 80° C. for 1 hour and poured into 200 ml of ice water. The crystals thus-precipitated were collected by filtration and washed with 20 ml of acetonitrile.

Yield: 5 g; Melting Point: above 200° C.

(4) Synthesis of Compound 1

To 9.4 g of the naphthol derivative obtained in Step (3) above, 5.3 g of 2-amino-4-hexadecyloxy-5-methylphenol hydrochloride, 60 ml of N,N-dimethylacetamide and 35 ml of pyridine were added. The mixture was stirred at 25° C. for 1 hour and 200 ml of a 75% aqueous methanol solution was added thereto. The crystals thus-precipitated were collected and recrystallized from 60 ml of ethyl acetate.

Yield: 8 g; Melting Point; 158° to 165° C.

SYNTHESIS EXAMPLE 2

Synthesis of Compound 2

To 4.9 g of the naphthol derivative obtained in Step (3) of Synthesis Example 1 above, 4.1 g of 2-(3-amino-6-methoxyethoxybenzene-1-sulfonamido)-4-hexadecyloxy-5-methylphenol, 25 ml of N,N-dimethylacetamide and 4 ml of pyridine were added. The mixture was stirred at 25° C. for 1 hour and 100 ml of a 75% aqueous methanol solution was added thereto. The crystals thus-precipitated were collected by filtration and recrystallized from a solution mixture of 20 ml of ethyl acetate, 10 ml of methanol and 10 ml of water.

Yield: 3 g; Melting Point: 230 ° to 232° C.

SYNTHESIS EXAMPLE 3

Synthesis of Compound 3

(1) Synthesis of 2-(N-4-Sulfoanilinocarbamoyl)-1-naphthol

To 13.2 g of 2-phenoxycarbonyl-1-naphthol, 8.6 g of sulfanilic acid, 20 ml of DMF and 14 ml of triethylamine were added. The mixture was stirred at 170° C. for 5 hours. The mixture was concentrated at reduced pressure and methanol was added to the residue. The crystals thus-precipitated were collected by filtration.

Yield: 12.5 g; Melting Point: above 200° C.

(2) Synthesis of 2-(N-4-Sulfoanilinocarbamoyl)-4-(2,4-dimethanesulfonylphenylazo)-1-naphthol To 10 ml of concentrated sulfuric acid, 1.5 g of sodium nitrite was added and the mixture was heated at 70° C. with stirring. After stirring for 30 minutes, the mixture was cooled to 0° C. and 20 ml of acetic acid and 6 ml of a 85% phosphoric acid were added thereto. Then 5.0 g of 1-amino-2,4-dimethanesulfonylbenzene was added at below 5° C. thereto and the mixture was stirred for 3 hours. After adding 40 ml of ice water, a solution containing 6.5 g of 2-(N-4-sulfoanilinocarbamoyl)-1-naphthol obtained in Step (1) of Synthesis Example 3 above dissolved in 20 ml of a 2% aqueous sodium hydroxide was added dropwise to the mixture and the mixture was stirred at below 5° C. for 1 hour. The crystals thus-precipitated were collected by filtration and washed with 50 ml of acetonitrile.

Yield: 9.0 g; Melting Point: above 200° C.

(3) Synthesis of 2-(N-4-Chlorosulfonylanilinocarbamoyl)-4-(2,4-dimethanesulfonylphenylazo)-1-naphthol To 0.9 g of the naphthol derivative obtained in Step (2) of Synthesis Example 3 above, 30 ml of acetonitrile and 13.7 ml of N,N-dimethylacetamide were added. 6.8 ml of phosphorous oxychloride was added dropwise at below 50° C. to the mixture. The mixture was stirred at 70° C. for 15 minutes and then at room temperature for 1 hour and poured into 200 ml of ice water. The crystals thus-precipitated were collected by filtration and washed with 30 ml of acetonitrile.

Yield: 2.1 g; Melting Point: above 200° C.

(4) Synthesis of Compound 3

To 2.1 g of the naphthol derivative obtained in Step (3) of Synthesis Example 3 above, 2.0 g of 2-(3-amino-6-methoxyethoxybenzenesulfonamido)-4-hexadecyloxy-5-methylphenol and 10 ml of N,N-dimethylacetamide were added. To the solution, 0.6 ml of pyridine was added dropwise at room temperature and the mixture was stirred for 1 hour. After adding 50 ml of methanol to the mixture, the crystals thus-precipitated were collected by filtration and recrystallized from acetonitrile.

Yield: 1.5 g; Melting Point: 170° to 175° C.

SYNTHESIS EXAMPLE 4

Synthesis of Compound 4

(1) Synthesis of 2-(N-3-Sulfoanilinocarbamoyl)-1-naphthol

To 13.2 g of 2-phenoxycarbonyl-1-naphthol, 8.6 g of methanilic acid, 20 ml of DMF and 14 ml of triethylamine were added and the mixture was stirred at 170° C. for 5 hours. The mixture was concentrated under reduced pressure and methanol was added to the residue. The crystals thus-precipitated were collected by filtration.

Yield: 9.2 g; Melting Point: above 200° C.

(2) Syhthesis of 2-(N-3-Sulfoanilinocarbamoyl)-4-(2,4-dimethanesulfonylphenylazo)-1-naphthol 1.5 g of sodium nitrite was added to 10 ml of concentrated sulfuric acid and the mixture was heated at 70° C. with stirring. After stirring for 30 minutes, the mixture was cooled to 0° C. and 20 ml of acetic acid and 6 ml of a 85% phosphoric acid were added thereto. Then 5.0 g of 1-amino-2,4-dimethanesulfonylbenzene was added to the mixture at below 5° C. and the mixture was stirred for 3 hours. After adding 40 ml of ice water to the solution, a solution containing 6.5 g of 2-(N-3-sulfoanilinocarbamoyl)-1-naphthol obtained in Step (1) of Synthesis Example 4 above dissolved in 20 ml of a 2% aqueous sodium hydroxide solution was added dropwise at below 5° C. The mixture was stirred at below 5° C. for 1 hour. The crystals thus-precipitated were collected by filtration and washed with 50 ml of acetonitrile.

Yield: 8.0 g; Melting Point: above 200° C.

(3) Synthesis of 2-(N-3-Chlorosulfonylanilinocarbamoyl)-4-(2,4-dimethanesulfonylphenylazo)-1-naphthol To 8.0 g of the naphthol derivative obtained in Step (2) of Synthesis Example 4 above, 30 ml of acetonitrile and 14.0 ml of N,N-dimethylacetamide were added and 7.0 ml of phosphorous oxychloride was added dropwise at below 50° C. to the mixture. The mixture was stirred at 50° C. for 1 hour and then at room temperature for 1 hour and poured into 200 ml of ice water. The crystals thus-precipitated were collected by filtration and washed with 30 ml of acetonitrile.

Yield: 5.1 g; Melting Point: above 200° C.

(4) Synthesis of Compound 4

To a solution containing 3.0 g of the naphthol derivative obtained in Step (3) of Synthesis Example 4 above, 1.9 g of 2-amino-4-hexadecyloxy-5-methylphenol hydrochloride and 20 ml of N,N-dimethylacetamide, 2.3 ml of pyridine was added dropwise at room temperature and the mixture was stirred for 2 hours. After adding 50 ml of methanol, the crystals thus-precipitated were collected by filtration and recrystallized from methanol.

Yield: 2.0 g; Melting Point: 238° to 243° C.

SYNTHESIS EXAMPLE 5

Synthesis of Compound 5

To a mixture containing 2.1 g of the naphthol derivative obtained in Step (3) of Synthesis Example 4 above, 2.0 g of 2-(3-amino-6-methoxyethoxybenzenesulfonamido)-4-hexadecyloxy-5-methylphenol and 15 ml of N,N-dimethylacetamide, 0.7 ml of pyridine was added dropwise at room temperature and the mixture was stirred for 1 hour. 30 ml of methanol was added to the mixture and the crystals thus-precipitated were collected by filtration and recrystallized from methanol.

Yield: 1.3 g; Melting Point: 135° to 145° C.

SYNTHESIS EXAMPLE 6

Synthesis of Compound 6

To a mixture containing 5.0 g of the naphthol derivative obtained in Step (3) of Synthesis Example 3, 3.2 g of 2-amino-4-hexadecyloxy-5-methylphenol hydrochloride and 20 ml of N,N-dimethylacetamide, 3.8 ml of pyridine was added dropwise at room temperature and the mixture was stirred for 90 minutes. 50 ml of methanol was added to the mixture and the crystals thus-precipitated were collected by filtration and recrystallized from a solvent mixture of N,N-dimethylacetamide and methanol.

Yield: 3.3 g; Melting Point: 135° to 145° C.

SYNTHESIS EXAMPLE 7

Synthesis of Compound 7

(1) Syhthesis of 4-(2,4-Dimethanesulfonylphenylazo)-5-(3-sulfobenzene-1-sulfonamido)-1-naphthol To 15.5 g of 5-(3-sulfobenzene-1-sulfonamido)-1-naphthol, 100 ml of acetone was added. To the mixture, a diazo solution obtained from 10 g of 1-amino-2,4-dimethanesulfonylbenzene (prepared in the same manner as described in Step (2) of Synthesis Example 1 above) was added at 5° C. with stirring and the mixture was stirred for 1 hour. The crystals thus-precipitated were collected by filtration and washed with 100 ml of methanol.

Yield: 21.5 g; Melting Point: above 200° C.

(2) Synthesis of 4-(2,4-Dimethanesulfonylphenylazo)-5-(3-chlorosulfonylbenzene-1-sulfonamido)-1-naphthol To a solution containing 10 g of the naphthol derivative obtained in Step (1) of Synthesis Example 7 above, 60 ml of acetonitrile and 10 ml of phosphorous oxychloride, 10 ml of N,N-dimethylacetamide was added dropwise with stirring. The mixture was stirred at 80° C. for 1 hour and poured into 300 ml of ice water. The crystals thus-precipitated were collected by filtration and washed with 50 ml of acetonitrile.

Yield: 8 g; Melting Point: above 200° C.

(3) Synthesis of Compound 7

To 8 g of the 1-naphthol derivative obtained in Step (2) of Synthesis Example 7 above, 6.7 g. of 2-(3-amino-6-methoxyethoxybenzene-1-sulfonamido)-4-hexadecyloxy-5-methylphenol, 35 ml of N,N-dimethylacetamide and 5 ml of pyridine were added and the mixture was stirred at 25° C. for 1 hour. To the mixture, 150 ml of a 75% aqueous methanol solution was added. The crystals thus-precipitated were collected by filtration and purified using a column.

Yield: 5 g; Melting Point: 133° to 148° C.

In the reproduction of natural color by subtractive color photography, a light-sensitive element used comprises at least two combinations each of which consists of a silver halide emulsion having a selective spectral sensitivity in a certain wavelength region and a compound capable of providing a dye having a selective spectral absorption at the same wavelength region as the emulsion. In particular, a light-sensitive element comprising a combination of a blue-sensitive silver halide emulsion and a compound capable of providing a yellow dye, a combination of a green-sensitive silver halide emulsion and a compound capable of providing a magenta dye, and a combination of a red-sensitive silver halide emulsion and a compound capable of providing a cyan dye is useful. As a matter of course, diffusible dye-releasing redox compounds of the present invention can be used as the above-described compounds capable of providing the dye. These combinations of silver halide emulsions and the dye providing compounds may be coated on a support as layers in a face-to-face relationship or may be coated on a support as a layer containing a mixture of particles of the silver halides and the dye providing compounds in a binder.

In a preferred embodiment of the present invention, both of a dye image-forming compound represented by the formula (I) and a dye image-forming compound represented by the formula (X) below are incorporated into a layer, and the layer and a silver halide emulsion layer are coated in a face-to-face relationship to prepare a combination unit.

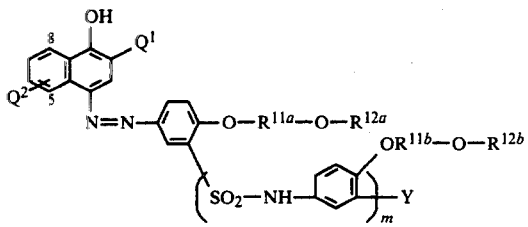 (X)

wherein $Q^1$ represents a hydrogen atom; a halogen atom; a sulfamoyl group represented by the formula $-SO_2NR^{13}R^{14}$ wherein $R^{13}$ represents a hydrogen atom, an alkyl group including a substituted alkyl group, $R^{14}$ represents a hydrogen atom or $R^{14a}$ wherein $R^{14a}$ represents an alkyl group including a substituted alkyl group, an alkenyl group, a cycloalkyl group, an aralkyl group, an aryl group or a heterocyclic group, and $R^{13}$ and $R^{14}$ may combine directly or through an oxygen atom to form a ring; a group represented by the formula $-SO_2R^{15}$ wherein $R^{15}$ represents an alkyl group including a substituted alkyl group or an aralkyl group (preferably a benzyl group); a carboxy group; a group represented by the formula $-COOR^{16}$ wherein $R^{16}$ represents an alkyl group including a substituted alkyl group or a phenyl group including a substituted phenyl group; or a group represented by the formula $-CONR^{13}R^{14}$ wherein $R^{13}$ and $R^{14}$ each has the same meaning as defined above.

$Q^2$ is positioned at the 5- or the 8-position to the hydroxy group and represents a hydroxy group, a group represented by the formula $-NHCOR^{14a}$ or a group represented by the formula $-NHSO_2R^{14a}$ wherein $R^{14a}$ has the same meaning as defined above; $R^{11a}$ and $R^{11b}$, which may be the same or different, each represents an alkylene group having 2 or more carbon atoms with the proviso that those which form an acetal linkage are excluded; $R^{12a}$ and $R^{12b}$, which may be the same or different, each represents an alkyl group including a substituted alkyl group, m represents 0 or 1; and Y has the same meaning as defined in the formula (I) and is preferably a sulfamoyl group of the formula (II). Dye image-forming compounds of the formula (X) and their synthesis are described in U.S. patent application Ser. No. 956,698, filed Nov. 1, 1978, now U.S. Pat. No. 4,268,624, (which corresponds to British Patent Application No. 42454/78, filed Oct. 30, 1978).

Also, a layer containing a compound represented by the formula (I) and a layer containing a compound represented by the formula (X) are separately formed and these layers and at least one silver halide emulsion layer are coated in a face-to-face relationship to prepare a unit. A silver halide emulsion layer which is used in a combination with a compound represented by the formula (I) and a compound represented by the formula (X) is preferably a green-sensitive silver halide emulsion layer.

The incorporation of a compound represented by the formula (I) and a compound represented by the formula (X) in one layer is accompanied with superior results, i.e., the improvement in solubility, the improvement in stability of a dispersion of the compounds. A compound represented by the formula (I) and a compound represented by the formula (X) can be mixed in an optional ratio as long as the color reproduction is not deteriorated. Preferably, about 99 to about 1 mol% of a compound represented by the formula (X) is mixed with about 1 to about 99 mol% of a compound represented by the formula (I) and more preferably about 99 to about 30 mol% of a compound represented by the formula (X) is mixed with about 1 to about 70 mol% of a compound represented by the formula (I). Particularly, a ratio of about 1 to about 30 mol% of a compound represented by the formula (I) is suitable for the purposes according to the present invention.

The compounds represented by the formula (X) are described in detail below.

In the description hereinafter, the terms $R^{11}$ and $R^{12}$ refer to $R^{11a}$ and $R^{11b}$ and $R^{12a}$ and $R^{12b}$, respectively, unless otherwise indicated.

The alkylene group having 2 or more carbon atoms represented by $R^{11}$ can be a straight chain or a branched chain alkylene group and an alkylene group having 2 to 8 carbon atoms is preferred with the proviso that a branched chain alkylene group which forms an acetal linkage being excluded (the term "acetal linkage" as used herein refers to the structure formed when the two oxygen atoms in the $-O-R^{11}-O-R^{12}$ moiety are connected to the same carbon atom). Particularly preferred examples of $R^{11}$ are a straight chain alkylene group represented by the formula $-(CH_2)_p-$, wherein p is an integer of 2 to 4, and a branched chain alkylene group having 3 to 4 carbon atoms such as $-CH(CH_3)CH_2-$ and $-CH_2CH_2CH(CH_3)-$ with the proviso that an alkylene group which forms an acetal linkage being excluded. In view of easy availability of starting materials, a $-CH_2CH_2-$ group is particularly advantageous for $R^{11}$. When $R^{11}$ represents a methylene group, an acetal linkage, in this case an $-O-CH_2-O-R^{12}$ linkage, is formed, which is undesirable since it is chemically unstable, particularly under acidic conditions, and tends to decompose during the preparation thereof. For the same reason, group where two oxygen atoms are bonded to the same carbon atom in the $R^{11}$ of the $-O-R^{11}-O-R^{12}$ group (i.e., forming an acetal linkage), are also not desirable.

The alkyl group represented by $R^{12}$ can be a straight chain or branched chain alkyl group and preferably is an alkyl group having 1 to 8 carbon atoms. From the standpoint of the preparation, an unsubstituted alkyl group is preferred. A particularly preferred example of $R^{12}$ is a straight chain or branched chain alkyl group having 1 to 4 carbon atoms (for example, a methyl group, an ethyl group, an n-propyl group, an isopropyl group, an n-butyl group, etc.). Suitable substituents which can be present on the substituted alkyl group for $R^{12}$ include, for example, an alkoxy group (for example, a methoxy group, an ethoxy group, etc.), a dialkylamino group (for example, a diethylamino group, etc.), and the like.

In the sulfamoyl group represented by the formula $-SO_2NR^{13}R^{14}$ for $Q^1$, $R^{13}$ is preferably a hydrogen atom, a straight, branched or cyclic alkyl group having 1 to 8 carbon atoms (more preferably 1 to 4 carbon atoms), or a substituted alkyl group having 1 to 8 carbon atoms (more preferably 1 to 4 carbon atoms) in the alkyl moiety. $R^{14}$ is preferably a hydrogen atom, a straight, branched or cyclic alkyl group having 1 to 8 carbon atoms (more preferably 1 to 4 carbon atoms), a substituted alkyl group having 1 to 8 carbon atoms (more preferably 1 to 4 carbon atoms) in the alkyl moiety, an alkenyl group having 1 to 8 carbon atoms (more preferably 1 to 4 carbon atoms), a cycloalkyl group having 3 to 8 carbon atoms (more preferably 5 to 8 carbon atoms), a benzyl group, a substituted benzyl group having 7 to 12 carbon atoms, a phenyl group, a substituted phenyl group having 6 to 9 carbon atoms or a 5-alkyl-1,3-dioxan-5-yl group. Also, $R^{13}$ and $R^{14}$ may be combined directly or through an oxygen atom to form a 5- or 6-membered ring.

The cases where: (1) $R^{13}$ and $R^{14}$ each represents a hydrogen atom and (2) one of $R^{13}$ and $R^{14}$ represents a hydrogen atom and the other of $R^{13}$ and $R^{14}$ represents an alkyl group having 1 to 4 carbon atoms are particularly preferred because of easy availability of the starting materials and excellent transferability of the dye compound formed. The same is true for the —CONR$^{13}$R$^{14}$ group.

With respect to the —SO$_2$R$^{15}$ group, $R^{15}$ preferably represents a straight, branched or cyclic alkyl group having 1 to 8 carbon atoms, a substituted alkyl group having 1 to 8 carbon atoms in the alkyl moiety or a benzyl group. In particular, an alkyl group having 1 to 4 carbon atoms and a benzyl group are preferred because of easy availability of the starting materials and excellent transferability of the dye compound formed.

In the case of the —COOR$^{16}$ group, $R^{16}$ preferably represents a straight, branched or cyclic alkyl group having 1 to 8 carbon atoms (more preferably 1 to 4 carbon atoms), a substituted alkyl group having 1 to 8 carbon atoms (more preferably 1 to 4 carbon atoms) in the alkyl moiety, a phenyl group or a substituted phenyl group having 6 to 9 carbon atoms.

Examples of suitable substituents which can be present in the above-described substituted alkyl groups represented by $R^{13}$ to $R^{16}$ and $R^{14a}$ include one or more of a cyano group, a $C_1$-$C_8$ and preferably $C_1$-$C_4$ alkoxy group, a hydroxy group, a carboxy group, a sulfo group, a tetrahydrofuryl group, etc., with the proviso that the alkyl groups are not substituted by a phenyl group or a substituted phenyl group. Further, examples of suitable substituents which can be present in the above-described substituted phenyl group represented by $R^{14a}$ or $R^{16}$ include one or more of a hydroxy group, a halogen atom, a carboxy group, a sulfo group, a sulfamoyl group, a $C_1$-$C_8$ and preferably $C_1$-$C_4$ alkyl group, a $C_1$-$C_8$ and preferably $C_1$-$C_4$ alkoxy group, etc.

The above-described substituted benzyl group represented by $R^{14}$ can preferably have 1 to 2 substituents. Examples of suitable substituents include a hydroxy group, a halogen atom, a carboxy group, a sulfo group, a sulfamoyl group, an alkyl group, an alkoxy group, a methylenedioxy group, etc. In particular, a hydroxy group, an alkoxy group having 1 to 4 carbon atoms and a methylenedioxy group are preferred. Examples of the substituted benzyl groups include an o-, m- or p-hydroxybenzyl group, an o-, m- or p-methoxybenzyl group, a 3-hydroxy-4-methoxybenzyl group, a 4-hydroxy-3-methoxybenzyl group, a 2-hydroxy-3-methoxybenzyl group, a 2,5-dimethoxybenzyl group, a 3,4-dimethoxybenzyl group, a methylenedioxybenzyl group, etc.

A preferred compound of the compounds represented by the formula (X) is a compound represented by the formula (X), and in which $R^{11a}$ and $R^{11b}$ each represents a —CH$_2$CH$_2$— group; $R^{12a}$ and $R^{12b}$, which may be the same or different, each represents a straight chain or branched chain alkyl group having 1 to 4 carbon atoms (for example, a methyl group, an ethyl group, an n-propyl group, an isopropyl group, an n-butyl group, etc.); $Q^1$ represents a hydrogen atom or a sulfamoyl group represented by the formula —SO$_2$NR$^{13}$R$^{14}$, wherein $R^{13}$ and $R^{14}$, which may be the same or different, each represents a hydrogen atom or $R^{14a}$ wherein $R^{14a}$ represents an alkyl group having 1 to 4 carbon atoms or a substituted alkyl group having 1 to 4 carbon atoms in the alkyl moiety, with examples of suitable substituents in the substituted alkyl group including a cyano group, an alkoxy group, a hydroxy group, a carboxy group, a sulfo group, etc., and also $R^{13}$ and $R^{14}$ can combine directly or through an oxygen atom to form a 5- or 6-membered ring; $Q^2$ represents a hydroxy group or an —NHSO$_2$R$^{14a}$ group substituted at the 5-position, wherein $R^{14a}$ has the same meaning as above; m has the same meaning as defined in the formula (X); and Y represents a group represented by the formulae (A), (B), (C), (D) or (E).

A particularly preferred compound of the compounds represented by the formula (X) is a compound represented by the formula (X) in which $R^{11a}$ and $R^{11b}$ each represents a —CH$_2$CH$_2$— group; $R^{12a}$ and $R^{12b}$ each represents a straight chain alkyl group having 1 to 4 carbon atoms; $Q^1$ represents a hydrogen atom or a sulfamoyl group represented by the formula —SO$_2$NR$^{13}$R$^{14}$ wherein both of $R^{13}$ and $R^{14}$ represents hydrogen atoms or one of $R^{13}$ and $R^{14}$ represents a hydrogen atom and the other of $R^{13}$ and $R^{14}$ represents an alkyl group having 1 to 4 carbon atoms; $Q^2$ represents a hydrogen atom or an —NHSO$_2$R$^{14a}$ group substituted at the 5-position wherein $R^{14a}$ represents an alkyl group having 1 to 4 carbon atoms or a substituted alkyl group having 1 to 4 carbon atoms in the alkyl moiety, with examples of the substituents include a cyano group, an alkoxy group, a hydroxy group, a carboxy group, a sulfo group, etc.; m has the same meaning as defined in the formula (X); and Y represents a group represented by the general formula (II).

A suitable coating amount of the emulsion ranges from about 0.1 g/m$^2$ to 10 g/m$^2$, preferably 0.3 g/m$^2$ to 4 g/m$^2$ (silver per m$^2$ of the support). A suitable total amount of the dye image-providing material(s) of this invention can range from about 0.01 to about 10 mols, preferably 0.05 to 0.5 mol, per mol of the silver halide.

The dye image-providing material of the present invention and the compound of the formula (X) can be mixed in an optional ratio as long as the color reproduction is not deteriorated. Preferably, about 99 to about 1 mol% of the compound of the formula (X) is mixed with about 1 to 99 mol% of the dye image-providing material of the present invention and more preferably about 30 to about 90 mol% of the compound of the formula (X) is mixed with about 70 to about 1 mol% of the dye image-providing material of the present invention. Particularly, about 50 to about 90 mol% of the compound of the formula (X) is mixed with about 50 to about 1 mol% of the dye image-providing material of the present invention.

Specific examples of dye image-forming compounds represented by the formula (X) are illustrated below.

Compound A-1

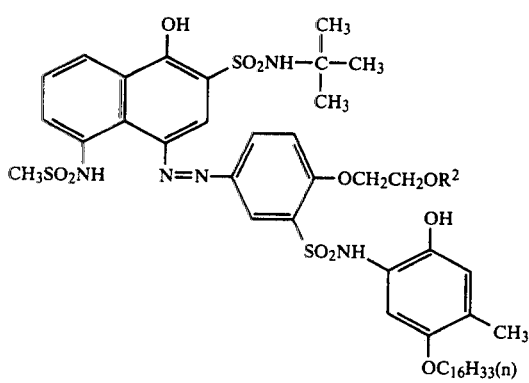

wherein R² is CH₃

Compound A-2

Same compounds as Compound A-1 except R² is C₂H₅.

Compound A-3

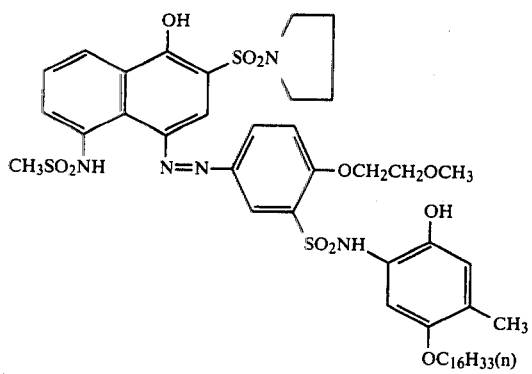

Compound A-4

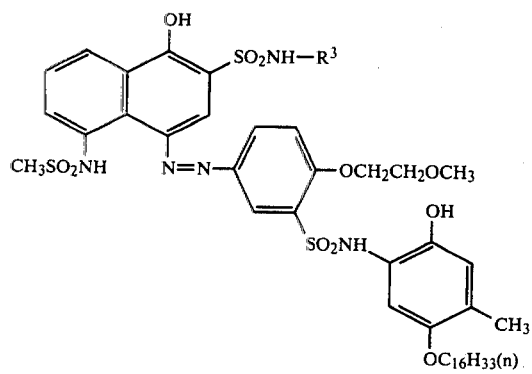

wherein R³ is H

Compound A-5

Same compound as Compound A-4 except R³ is CH₃.

Compound A-6

Same compound as Compound A-4 except R³ is n-C₄H₉.

Compound A-7

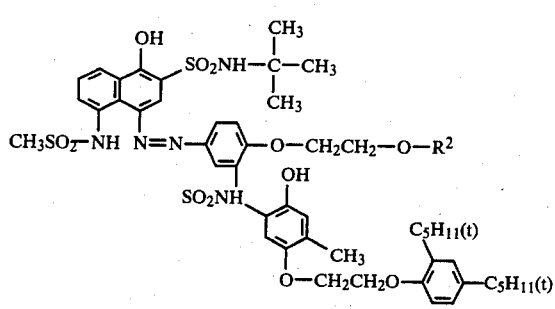

wherein R² is CH₃

Compound A-8

Same compound as Compound A-7 except R² is C₂H₅.

Compound A-9

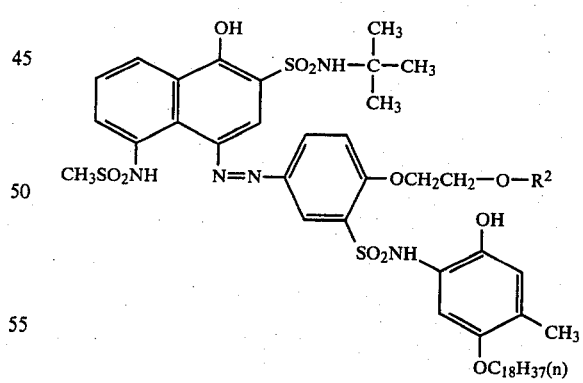

wherein R² is CH₃

Compound A-10

Same compound as Compound A-9 except R² is C₂H₅.

Compound A-11

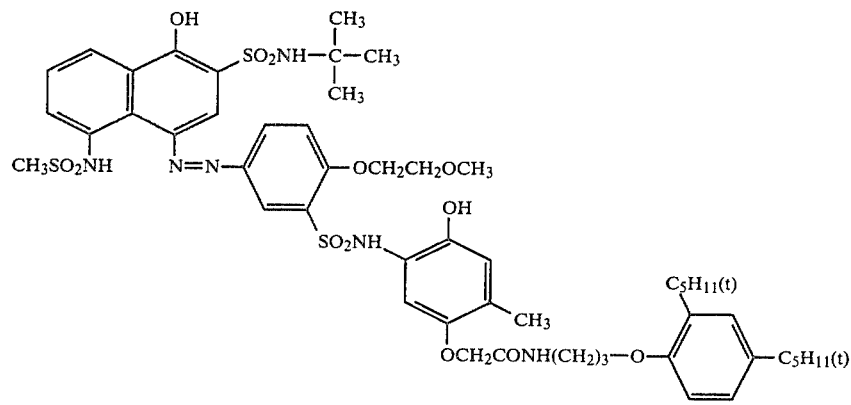
Compound A-12
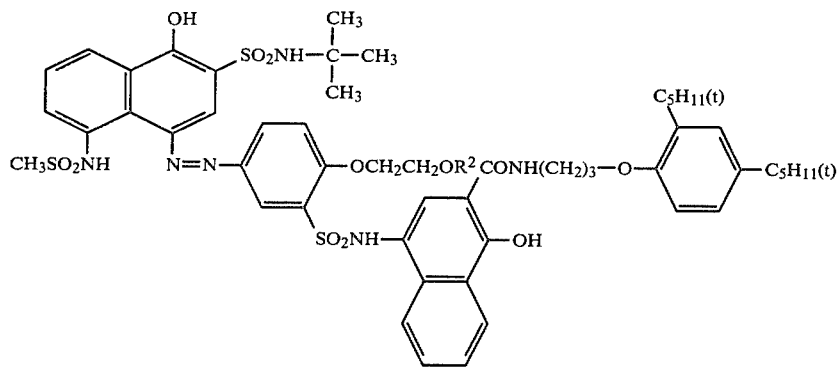
wherein R² is CH₃
Compound A-14
Compound A-13
Same compound as Compound A-12 except R² is C₂H₅.
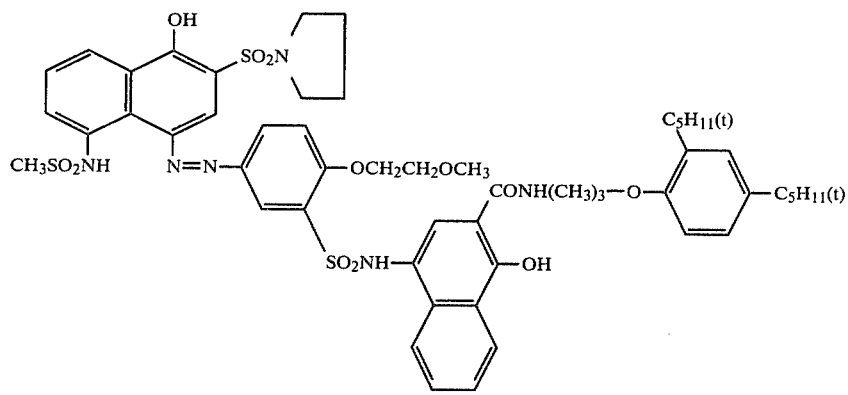

Compound A-15

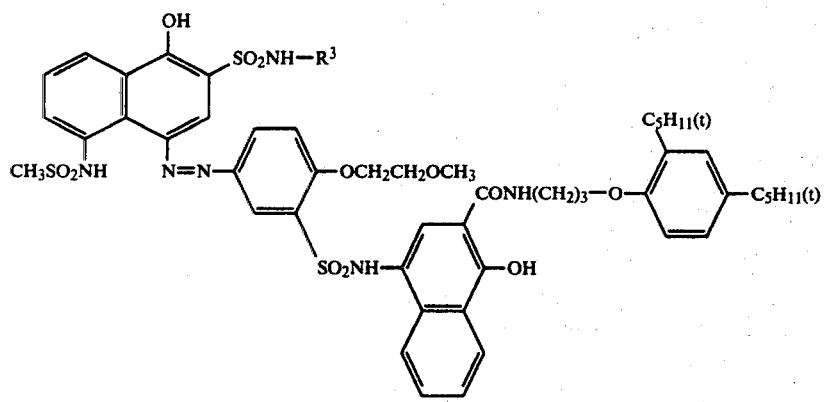

wherein R³ is H

Compound A-16

Same compound as Compound A-15 except R³ is CH₃

Compound A-17

Same compound as Compound A-15 except R³ is n-C₄H₉.

Compound A-18

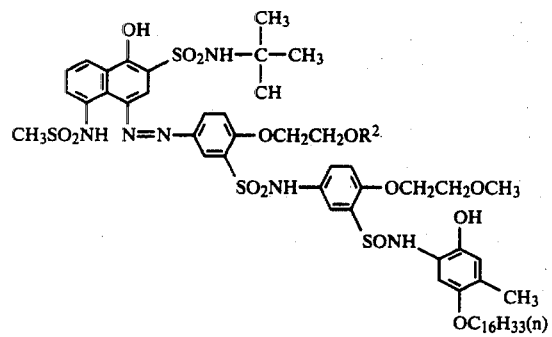

wherein R² is CH₃

Compound A-19

Same compound as Compound A-18 except R² is C₂H₅.

Compound A-20

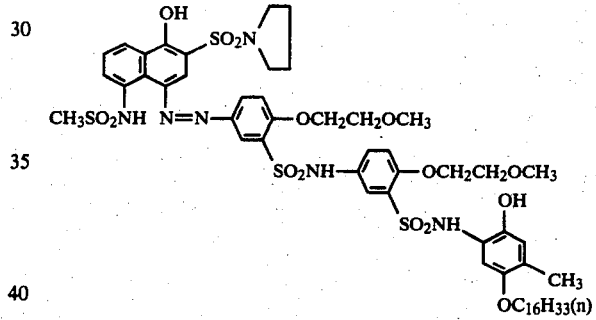

Compound A-21

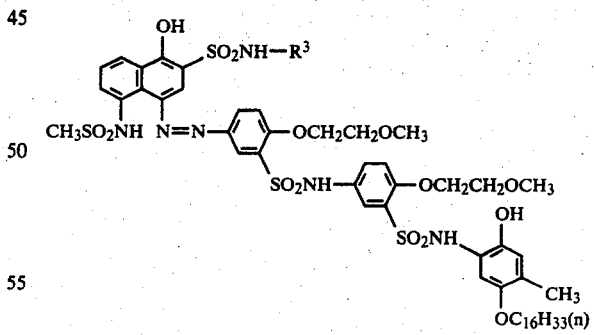

wherein R³ is H

Compound A-22

Same compound as Compound A-21 except R³ is CH₃.

Compound A-23

Same compound as Compound A-21 except R³ is n-C₄H₉.

Compound A-24

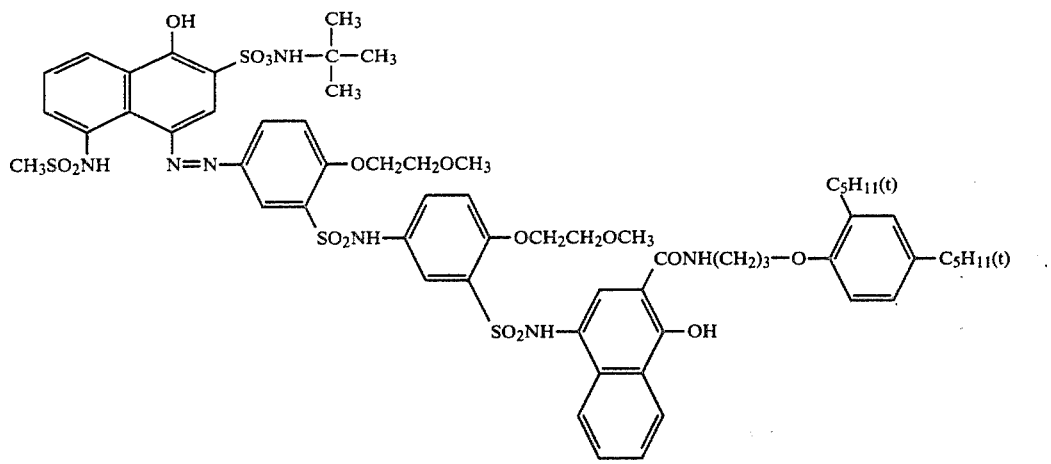

Compound A-25

Same compound as Compound A-4 except $R^3$ is $C_2H_5$.

Compound A-26

Same compound as Compound A-4 except $R^3$ is $CH_3OCH_2CH_2$.

Compound A-27

Same compound as Compound A-4 except $R^3$ is $(CH_3)_2CH$.

Compound A-28

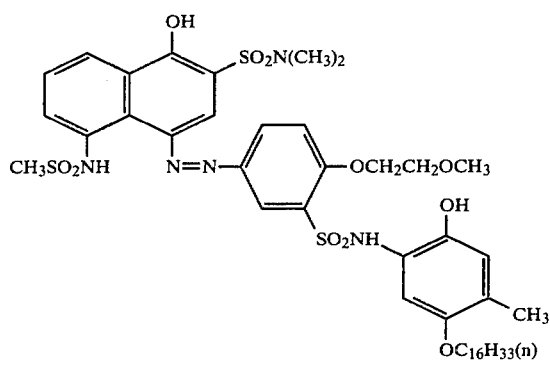

Compound A-29

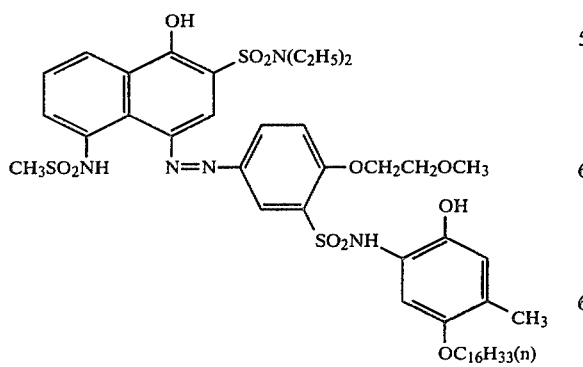

Compound A-30

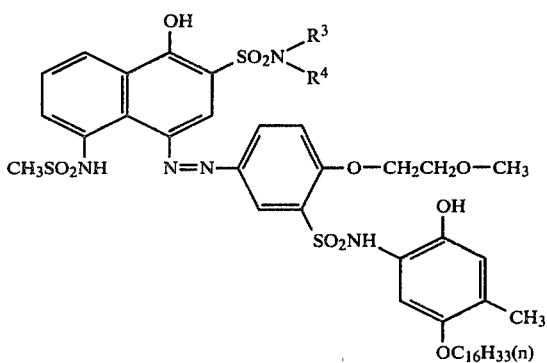

wherein $R^3$ is H and $R^4$ is cyclopentyl

Compound A-31

Same compound as Compound A-30 except $R^3$ is H and $R^4$ is cyclohexyl.

Compound A-32

Same compound as Compound A-30 except $R^3$ is H and $R^4$ is

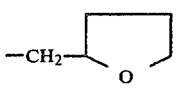

Compound A-33

Same compound as Compound A-30 except $R^3$ is H and $R^4$ is

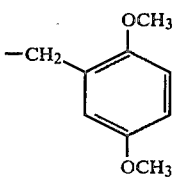

Compound A-34

Same compound as Compound A-30 except $R^3$ is H and $R^4$ is $-CH_2-CH=CH_2$.

Compound A-35

Same compound as Compound A-30 except $R^3$ is H and $R^4$ is

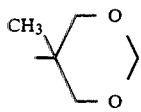

Compound A-36

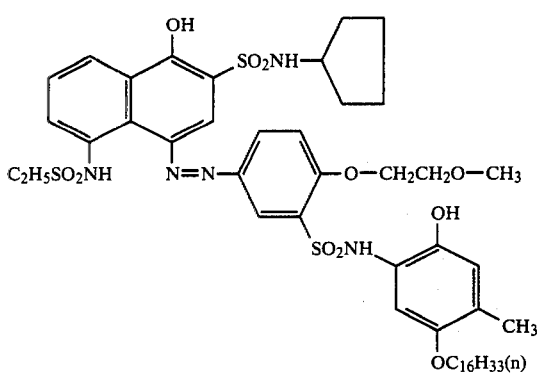

The light-sensitive sheet of the present invention is prepared by coating directly or indirectly at least one light-sensitive silver halide photographic emulsion layer with the dye-releasing redox compound according to the present invention associated therewith onto a substantially planar material which does not undergo large dimensional changes during processing (specific examples are those known is photographic supports).

In a preferred multilayer structure, a blue-sensitive unit, a green-sensitive unit and a red-sensitive unit are positioned in this order from the side of incident light of exposure and, in particular, it is desirable for a yellow filter layer to be positioned between the blue-sensitive unit and the green-sensitive unit when a highly sensitive silver halide emulsion is used in the units. The yellow filter layer usually contains a dispersion of yellow colloidal silver, a dispersion of an oil-soluble yellow dye, an acid dye mordanted to a basic polymer, or a basic dye mordanted to an acid polymer.

It is advantageous for the units to be separated from each other by an interlayer. The interlayer acts to prevent the occurrence of undesirable interactions between the differently color-sensitized units. The interlayer employed in such a case is usually composed of a hydrophilic polymer such as gelatin, polyacrylamide, a partially hydrolyzed product of polyvinyl acetate, etc., a polymer containing fine pores formed from a latex of a hydrophilic polymer and a hydrophobic polymer, e.g., as described in U.S. Pat. No. 3,625,685, or a polymer whose hydrophilic property is gradually increased by the processing composition, such as calcium alginate, as described in U.S. Pat. No. 3,384,483, individually or as a combination thereof.

In order to prevent the diffusion of the oxidation product of a developing agent from one unit to another unit, a compound having a function of capturing the oxidation product of a developing agent, for example, a color stain-preventing agent such as 2,5-di(sec-dodecyl)hydroquinone, etc., can be incorporated into the interlayer.

The silver halide emulsions which can be used in the present invention are a dispersion of silver chloride, silver bromide, silver chlorobromide, silver iodobromide, silver chloroiodobromide or a mixture thereof in a hydrophilic colloid. The halide composition of the silver halide is selected depending on the purpose of the photographic materials and the processing conditions for the photographic materials, but a silver bromide emulsion or a silver iodobromide emulsion or a silver chloroiodobromide emulsion having a halide composition of 1 to 10 mol% iodide, less than 30 mol% chloride, and the balance bromide is particularly preferred.

Also, silver halide emulsions which form a latent image on the surface of the silver halide grains, silver halide emulsions which form a latent image inside the silver halide grains as described in U.S. Pat. Nos. 2,592,550 and 3,206,313, etc., and direct positive silver halide emulsions can be used in the present invention.

The silver halide emulsions used in the present invention can possess, if desired, a color sensitivity expanded with a spectral sensitizing dye or dyes.

The dye image-forming compound used in this invention can be dispersed in a hydrophilic colloid using various techniques, depending on the type of compound. For example, when the compound has a dissociable group such as a sulfo group or a carboxy group, the compound can be added to an aqueous solution of a hydrophilic colloid as a solution in water or as an aqueous alkaline solution thereof. On the other hand, when the compound is sparingly soluble in aqueous medium but is readily soluble in organic solvents, the compound is first dissolved in an organic solvent and then the solution is finely dispersed in an aqueous solution of a hydrophilic colloid with stirring. Such a dispersing method is described in detail in, for example, U.S. Pat. Nos. 2,322,027, 2,801,171, 2,949,360 and 3,396,027.

To stabilize the dispersion of the dye image-forming compound and also to promote dye image formation, it is advantageous to incorporate the dye image-forming compound into a light-sensitive element as a solution in a solvent which is substantially insoluble in water and has a boiling point of higher than about 200° C. at normal pressure. Examples of suitable high boiling solvents which can be used for this purpose are aliphatic esters such as the triglycerides of higher fatty acids, dioctyl adipate, etc.; phthalic acid esters such as di-n-butyl phthalate, etc.; phosphoric acid esters such as tri-o-cresyl phosphate, tri-n-hexyl phosphate, etc.; amides such as N,N-diethyllaurylamide, etc.; and hydroxy compounds such as 2,4-di-n-amylphenol. Furthermore, to stabilize the dispersion of the dye-releasing redox compound and to promote dye image formation, it is also advantageous to incorporate an oleophilic polymer into the light-sensitive sheet together with the dye releasing redox compound. Examples of suitable oleophilic polymers which can be used for this purpose are shellac, a phenolformaldehyde condensate, poly-n-butyl acrylate, a copolymer of n-butyl acrylate and acrylic acid, an interpolymer of n-butyl acrylate, styrene and methacrylamide, etc. Such an oleophilic polymer may be dissolved in an organic solvent together with the dye image-forming compound and then may be dispersed in a photographic hydrophilic colloid such as gelatin as a solution thereof or may be added to a dispersion in a hydrophilic colloid of the dye image-forming compound as the hydrosol of a polymer prepared by emulsion polymerization, etc.

The dispersion of the dye image-forming compound can be greatly promoted by using a surface active agent as an emulsification aid. Examples of suitable surface active agents useful for dispersion of the dye image-forming compound used in this invention are sodium triisopropylnaphthalene-sulfonate, sodium dinonylnaphthalenesulfonate, sodium p-dodecylbenzenesulfonate, sodium dioctyisulfosuccinate, sodium cetylsulfate, and the anionic surface active agent as described in Japanese Patent Publication No. 4293/1964 and British Pat. No. 1,138,514. The use of these anionic surface active agents and the higher fatty acid ester of anhydrohexitol exhibits particularly excellent emulsifying capability as disclosed in U.S. Pat. No. 3,676,141. A suitable amount of the surface active agent ranges from about 1% to about 20% by weight per gram of the dye image providing material. Furthermore, the dispersing methods disclosed in Japanese Patent Publication No. 13837/1968 and U.S. Pat. Nos. 2,992,104, 3,044,873, 3,061,428 and 3,832,173 can be effectively employed for dispersing the dye image-forming compound according to the present invention.

One example of the formation of color diffusion transfer images using a dye image-forming compound, especially a dye-releasing redox compound (e.g., a compound represented by the formulae (A), (B), (C), (D) or (E)) according to the present invention is described below.

(A) A light-sensitive sheet comprising a support having thereon at least one light-sensitive silver halide emulsion layer with the dye image-forming compound according to the present invention associated therewith (hereinafter referred to light-sensitive element) is imagewise exposed.

(B) An alkaline processing composition is spread on the above-described light-sensitive silver halide emulsion layer whereby development of all light-sensitive silver halide emulsion layers in the presence of a developing agent for silver halide is conducted.

(C) As a result, an oxidation product of the developing agent produced in proportion to the amount of exposure cross-oxidizes the dye image-forming compound.

(D) The above-described oxidation product of the dye image-forming compound splits to release a diffusible dye.

(E) The released dye imagewise diffuses to form a transferred image on an image-receiving layer (directly or indirectly) adjacent the light-sensitive silver halide emulsion layer. Dye images can be formed from compounds of the formulae (F) or (H) by a similar process except in step (D) the oxidation product does not release a dye but residual (i.e., unoxidized) dye image-forming compounds split to release a dye. In the case of a compound represented by the formula (G) processing steps (A), (B) and (E) are the same but in step (C) an oxidation product of the developing agent is unable to react with a compound of the formula (G), but the unreacted developing agent reduces the compound (G) imagewise and in step (D) the reduced compound (G) conducts intermolecular ring closure to release a diffusible dye.

In the above-described process, any silver halide developing agents which can cross-oxidize the dye image-forming compound can be used. These developing agents may be incorporated into the alkaline processing composition or may be incorporated into appropriate photographic layers of the light-sensitive element. Specific examples of suitable developing agents which can be used in this invention are, for example, hydroquinones; aminophenols such as N-methylaminophenol; pyrazolidones such as phenidone, 1-phenyl-3-pyrazolidone, dimezone (1-phenyl-4,4-dimethyl-3-pyrazolidone), 1-phenyl-4-methyl-4-oxymethyl-3-pyrazolidone; phenylenediamines such as N,N-diethyl-p-phenylenediamine, 3-methyl-N,N-diethyl-p-phenylenediamine, 3-methoxy-N-ethoxy-p-phenylenediamine; etc.

Of the above-indicated developing agents, black-and-white developing agents having the capability, in general, of reducing the occurrence of stains in image-receiving layers are particularly preferred in comparison with color developing agents such as phenylenediamines.

An image-receiving layer, a neutralizing layer, a neutralization rate controlling layer (timing layer) and a processing composition which can be used together with the light-sensitive sheet of the present invention are described in, for example, Japanese Patent Application No. 64533/1977.

The photographic light-sensitive sheet of the present invention is preferably a photographic film unit, that is a film unit which has a construction such that after imagewise exposure, the processing of the film unit is performed by passing the film unit through a pair of juxtaposed pressure-applying members.

An embodiment of the superimposed and integral type film unit to which the present invention is most preferably applicable is disclosed in Belgian Pat. No. 757,959. According to this embodiment, the film unit is prepared by coating on a transparent support an image-receiving layer, a substantially opaque light reflective layer (for example, a $TiO_2$-containing layer and a carbon black-containing layer), and a single or plurality of light-sensitive layers as described above, in this order, and further superimposing a transparent cover sheet on the light-sensitive layer in a face-to-face relationship. A rupturable container retaining an alkaline processing composition having incorporated therein an opacifying agent such as, for example, carbon black, is disposed adjacent to and between the uppermost layer (protective layer) of the above-described light-sensitive element and the transparent cover sheet. The film unit is imagewise exposed in a camera through the transparent cover sheet and then the rupturable container retaining the alkaline processing composition is ruptured by the pressure-applying members when the film unit is withdrawn from the camera to spread uniformly the processing composition containing the opacifying agent between the light-sensitive layer and the cover sheet, whereby the film unit is shielded from light in a sandwich form and development proceeds in a light place.

In these embodiments of film units, the neutralization mechanism as described above is preferably incorporated therein. In particular, the neutralizing layer is preferably positioned in the cover sheet and, further, the timing layer is positioned on the side toward where the processing solution is to be spread, if desired.

Moreover, other useful embodiments of the integral type of film units wherein the compound of this invention can be used are described in, for example, U.S. Pat. Nos. 3,415,644, 3,415,645, 3,415,646, 3,647,487, and 3,635,707 and German Patent Application (OLS) No. 2,426,980.

The following examples are given to further illustrate this invention in greater detail.

EXAMPLE 1

On a transparent polyethylene terephthalate film support were coated the layers described below in the order listed to prepare an integral type of multilayer multicolor light-sensitive element.

(1) An image-receiving layer containing 3.0 g/m² of copoly-[styrene-N-vinylbenzyldimethyl-p-chlorobenzylammoniumchloride] and 3.0 g/m² of gelatin.

(2) A white reflecting layer containing 22 g/m² of titanium dioxide and 2.2 g/m² of gelatin.

(3) An opaque layer containing 2.7 g/m² of carbon black and 2.7 g/m² of gelatin.

(4) A layer containing 0.70 g/m² of a cyan dye-releasing redox compound described below, 0.3 g/m² of N,N-diethyllaurylamide and 1.1 g/m² of gelatin.

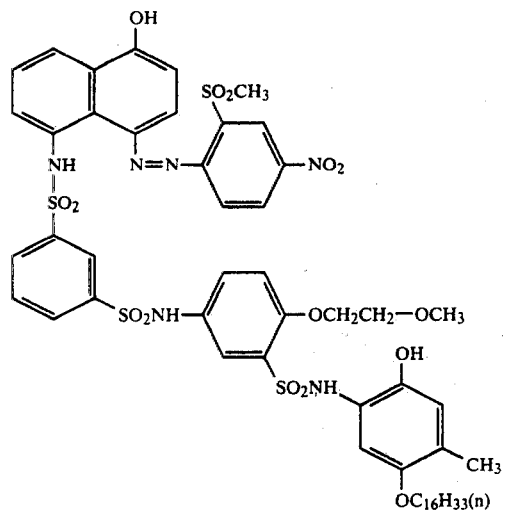

(5) A layer containing a red-sensitive internal latent image type silver iodobromide emulsion (containing 2 mol% of silver iodide, 1.1 g/m² of gelatin and 1.4 g/m² of silver), 0.022 g/m² of 2-methyl-3-(2-formalethyl)benzothiazolium bromide and 0.06 g/m² of 2,5-di-tert-octylhydroquinone.

(6) A layer containing 1.8 g/m² of gelatin and 0.8 g/m² of 2,5-di-octylhydroquinone.

(7) A layer containing 0.88 g/m² of Compound 7 (magenta dye-releasing redox compound) described above, 1.3 g/m² of N,N-diethyllaurylamide and 1.5 g/m² of gelatin.

(8) A layer containing a green-sensitive internal latent image type silver iodobromide emulsion (containing 2 mol% of silver iodide, 1.1 g/m² of gelatin and 1.4 g/m² of silver), 0.03 g/m² of 2,5-di-octylhydroquinone and 0.019 g/m² of 2-methyl-3-(2-formylethyl)benzothiazolium bromide.

(9) A layer containing 1.5 g/m² of gelatin and 0.6 g/m² of 2,5-di-octylhydroquinone.

(10) A layer containing 0.9 g/m² of a yellow dye-releasing redox compound described below, 1.5 g/m² of N,N-diethyllaurylamide, 1.5 g/m² of gelatin and 0.01 g/m² of 2,5-di-tert-butylhydroquinone.

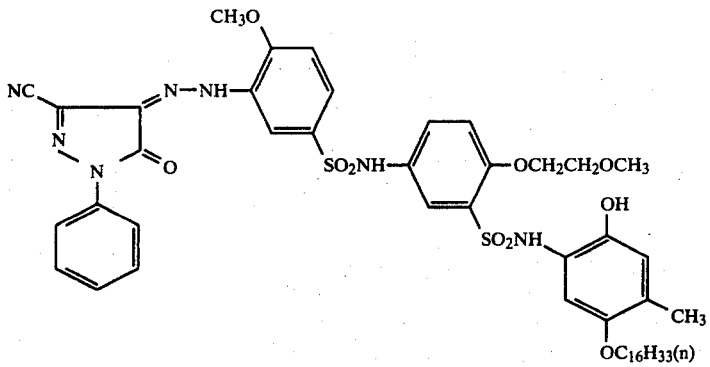

(11) A layer containing a blue-sensitive internal latent image type silver iodobromide emulsion (containing 2 mol% of silver iodide, 1.1 g/m² of gelatin and 1.4 g/m² of silver), 0.03 g/m² of 2,5-di-tert-octylhydroquinone and 0.017 g/m² of 2-methyl-3-(2-formylethyl)benzothiazolium bromide.

(12) A layer containing 0.6 g/m² of gelatin.

(13) A cover sheet produced by coating on a transparent polyethylene terephthalate film support the following layers in the order listed:

(i) A neutralizing layer composed of 10 g/m² of polyacrylic acid (ii) A timing layer composed of 10 g/m² of acetyl cellulose A sealed container retaining the processing solution having the composition described below was assembled in the light-sensitive sheet. The container was so designed and disposed that a certain portion of the container was easily ruptured and the processing solution would be spread between the above-described layer (12) and the cover sheet (13) when the film unit was passed through a pair of juxtaposed pressure-applying rollers.

The above-described light-sensitive sheet was imagewise exposed in a camera and passed through a pair of rollers to spread the processing solution whereby transferred dye images were obtained. The cyan transferred image was particularly excellent of the transferred dye images from the standpoint of transferability and light fastness.

Similar preferred results were obtained when Compounds 1, 3, 4, 5, and 6 of this invention (magenta dye releasing redox compounds) described above were respectively used in place of Compound 7 described above.

| Composition of Viscous Processing Solution | | |
|---|---|---|
| Water | 820 | cc |
| 1N Sulfuric Acid | 5 | cc |
| Hydroxyethyl Cellulose | 60 | g |
| 4-Hydroxymethyl-4-methyl-1-phenyl-3-pyrazolidone | 5 | g |
| 5-Methylbenzotriazole | 2 | g |
| tert-Butylhydroquinone | 0.4 | g |
| Sodium Sulfite | 2 | g |
| Carbon Black | 150 | g |
| Sodium Hydroxide | 30 | g |

EXAMPLE 2

Dye Compound A of the following formula:

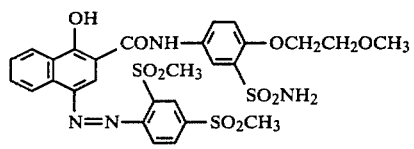

which is released from Compound 1 according to the present invention was dissolved in N,N-dimethylformamide (DMF) to prepare a $10^{-3}$M solution. 0.25 ml of the solution was diluted with 11.5 ml of DMF and a mixture of 1.25 ml of a $10^{-1}$M DMF solution of butyl acrylate and 12.5 ml of a buffer having a pH of 5.05 (Britton-Robinson Buffer) was added thereto. The solution was allowed to stand at room temperature (25°–29° C.) and the decrease of absorbance at a maximum absorption wavelength in a visible region was measured. From the values measured the remaining rate of Dye Compound A was determined and assuming that the decrease of dye A can be shown by a pseudo first order equation, a reaction rate constant of the pseudo first order reaction, i.e., k was determined.

In the same manner k was determined with respect to Dye Compound B of the following formula:

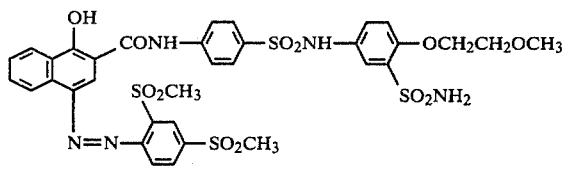

which is released from Compound 3, Dye Compound C of the following formula:

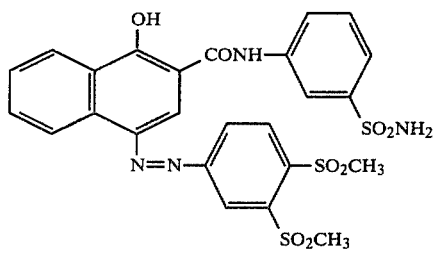

which is released from Compound 4, Dye Compound D of the following formula:

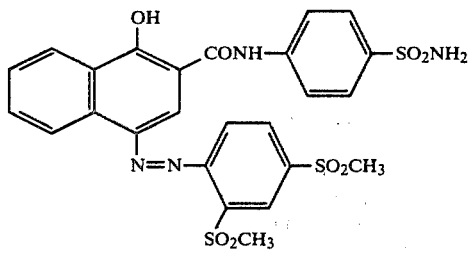

which is released from Compound 6, Dye Compound E of the following formula:

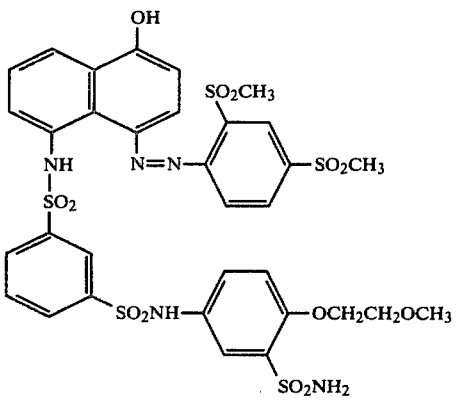

which is released from Compound 7, and Dye Compound F of the following formula:

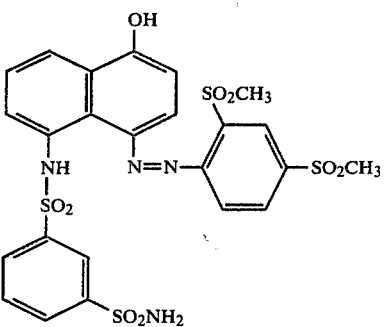

For comparison, k was determined with respect to Comparison Compounds G and H described below which are released from the compounds described in Japanese Patent Application (OPI) No. 115528/1975 in the same manner.

Comparison Compound G

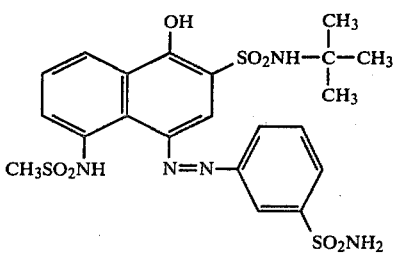

Comparison Compound H

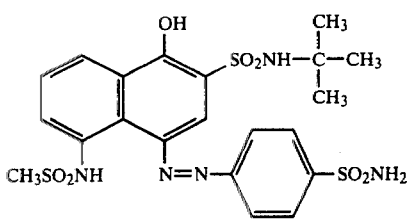

The results are shown in Table 1.

TABLE 1

| Reaction of Released Dye Compound with Butyl Acrylate | |
|---|---|
| Compound | k (day$^{-1}$) |
| Compound A | 0.003 |
| Compound B | 0.007 |
| Compound C | 0.003 |
| Compound D | 0.005 |
| Compound E | 0.005 |
| Compound F | 0.006 |
| Comparison Compound G | 0.072 |
| Comparison Compound H | 0.098 |

As is apparent from the results shown in Table 1, Compounds A to F have extremely superior fastness in comparison with Comparison G and H. The results shown in Table 1 are well corresponding to results of fading-in-dark in photographic light-sensitive sheets.

While the invention has been described in detail and with reference to specific embodiments thereof, it will be apparent to one skilled in the art that various changes and modifications can be made therein without departing from the spirit and scope thereof.

What is claimed is:

1. A photographic light-sensitive sheet for the color diffusion transfer process which comprises a support having thereon at least one light-sensitive silver halide emulsion layer having associated therewith a compound represented by the following general formula:

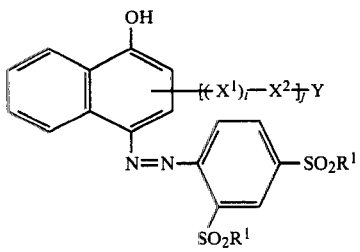

wherein $X^1$ represents —J—NR$^2$— or —NR$^2$—J— wherein R$^2$ represents a hydrogen atom or an alkyl group, and J represents —SO$_2$— or —CO—; R$^1$ represents an alkyl group; $X^2$ represents —R$^3$—(L)$_k$—(R$^4$)$_l$ wherein R$^3$ and R$^4$, which may be the same or different, each represents an alkylene group, or a phenylene group, L represents —O—, —CO—, —SO$_2$NH—, —CONH—, —NHSO$_2$—, —NHCO—, —SO$_2$—or —SO—, k represents 0 or 1, and l represents 1 when k is 1, or 1 or 0 when k is 0, provided that when $X^2$ bonds to $X^1$, $X^1$ bonds to R$^3$; i and j each represents 0 or 1; and Y represents a moiety which provides as a result of development processing under alkaline conditions, an azo dye compound having a different diffusibility from that of the azo dye image-forming compound represented by the formula (I), wherein said photographic light-sensitive sheet further contains a dye image-forming compound represented by the following formula (X):

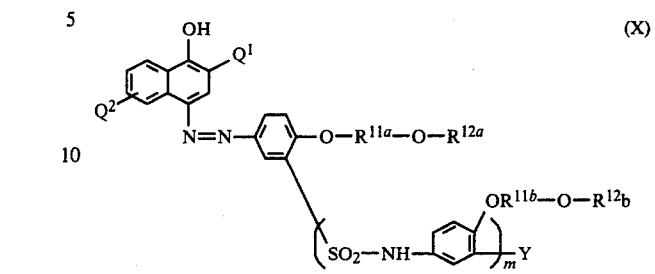

wherein $Q^1$ represents a hydrogen atom, a halogen atom, a sulfamoyl group represented by the formula —SO$_2$ NR$^{13}$R$^{14}$ wherein R$^{13}$ represents a hydrogen atom or an alkyl group; R$^{14}$ represents a hydrogen atom or R$^{14a}$ wherein R$^{14a}$ represents an alkyl group, an alkenyl group, a cycloalkyl group, an aralkyl group, an aryl group or a heterocyclic group; and R$^{13}$ and R$^{14}$ may combine directly or through an oxygen atom to form a ring; a group represented by the formula —SO$_2$R$^{15}$ wherein R$^{15}$ represents an alkyl group or an aralkyl group; a carboxy group; a group represented by the formula —COOR$^{16}$ wherein R$^{16}$ represents an alkyl group, or a phenyl group; or a group represented by the formula —CONR$^{13}$ R$^{14}$ wherein R$^{13}$ and R$^{14}$ each has the same meaning as defined above; $Q^2$ is positioned at the 5- or the 8-position to the hydroxy group and represents a hydroxy group, a group represented by the formula —NHCOR$^{14a}$ or a group represented by the formula —NHSO$_2$R$^{14a}$ wherein R$^{14a}$ has the same meaning as defined above; R$^{11a}$ and R$^{11b}$, which may be the same or different, each represents an alkylene group having 2 or more carbon atoms provided that the two oxygen atoms in the —O—R$^{11a}$ and —OR$^{11b}$—OR$^{12b}$ moiety are not connected to the same carbon atom; R$^{12a}$ and R$^{12b}$, which may be the same or different, each represents an alkyl group, m represents 0 or 1; and Y represents a moiety which provides as a result of development processing under alkaline conditions, an azo dye compound having a different diffusibility from that of the azo dye image-forming compound represented by the formula (X).

2. The photographic light-sensitive sheet of claim 1, wherein R$_1$ is an alkyl group having 1 to 8 carbon atoms.

3. The photographic light-sensitive sheet of claim 1, wherein Y is represented by the formula (A):

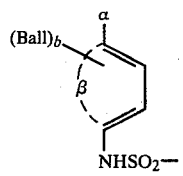

wherein

β represents the non-metallic atoms necessary to complete a benzene ring to which a carbocylic or a heterocyclic ring may be fused, wherein said benzene ring or said fused carbocyclic or heterocyclic ring may be substituted with a halogen atom, an alkyl group, an alkoxy group, an aryl group, an aryloxy group, a nitro group, an amino group, n alkylamino group, an arylamino group, a cyano group, an alkylmercapto group, a keto group, a carboalkoxy group, or a heterocyclic ring;

α represents an —OG¹ or an —NHG² group, wherein G¹ represents a hydrogen atom or a group capable of forming a hydroxyl group upon hydrolysis and G² represents a hydrogen atom, an alkyl group having 1 to 22 carbon atoms or a hydrolyzable group; and b is 0, 1 or 2, wherein b is 0 G² is an alkyl group having 9 to 22 carbon atoms.

4. The photographic light-sensitive sheet of claim 1, wherein Y is a group represented by the formula (B):

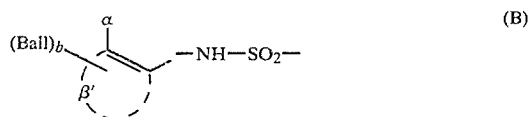

(B)

wherein
α represents an —OG¹ or an —NHG² group, wherein G¹ represents a hydrogen atom or a group capable of forming a hydroxyl group by hydrolysis and G² represents a hydrogen atom, an alkyl group having 1 to 22 carbon atoms or a hydrolyzable group;

β' represents the atoms necessary to complete a benzene ring to which a carbocyclic ring or a heterocyclic ring may be fused and which may be substituted with a halogen atom, an alkyl group, an alkoxy group, an aryl group, an aryloxy group, a nitro group, an amino group, an alkylamino group, an arylamino group, an amido group, a cyano group, an alkylmercapto group, a keto group, a carboalkoxy group, or a heterocyclic ring; and b is 0, 1 or 2, wherein when b is 0 G² is an alkyl group having 9 to 22 carbon atoms.

5. The photographic light-sensitive sheet of claim 1, wherein Y is a group represented by the formula (C):

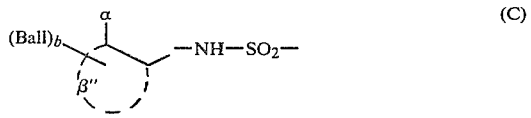

(C)

wherein
α is an —OG¹ or an —NHG² group, wherein G¹ represents a hydrogen atom or a group capable of forming a hydroxyl group by hydrolysis and G² represents a hydrogen atom, an alkyl group having 1 to 22 carbon atoms or a hydrolyzable group;

β" represents the atoms necessary to complete a heterocyclic ring to which may be fused with a carbocyclic ring or another heterocyclic ring wherein the rings may be substituted by a halogen atom, an alkyl group, an alkoxy group, an aryl group, an aryloxy group, a nitro group, an amino group, an alkylamino group, an arylamino group, an amido group, a cyano group, an alkylmercapto group, a keto group, a carboalkoxy group, or a heterocyclic ring; and b is 0, 1 or 2, wherein when b is 0 G² is an alkyl group having 9 to 22 carbon atoms.

6. The photographic light-sensitive sheet of claim 1, wherein Y is a group represented by the formula (D):

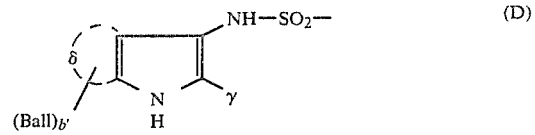

(D)

wherein γ represents a hydrogen atom, an alkyl group, an aryl group, or a heterocyclic ring which may be substituted or unsubstituted; or a —COG⁶ group wherein G⁶ represents —OG⁷, —SG⁷ or —NG⁸G⁹, wherein G⁷ represents a hydrogen atom, an alkyl group, a cycloalkyl group or an aryl group, G⁸ represents an acyl group or a G⁷ group and G⁹ represents a hydrogen atom or a substituted or unsubstituted alkyl group; δ represents the atoms necessary to complete a fused benzene ring which may be substituted and at least one of γ and/or the substituents of said fused benzene ring completed by δ is a ballast group or a ballast containing group and b' represents 0 or 1 when γ contains more than 8 carbon atoms and 1 or 2 when γ contains 1 to 8 carbon atoms.

7. The photographic light-sensitive sheet of claim 1, wherein Y is a sulfamoyl group represented by the following formula:

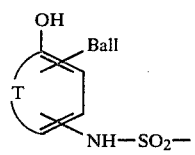

wherein Ball represents a ballast group; T represents the carbon atoms necessary to complete a benzene ring which may be substituted, or a naphthalene ring which may be substituted; the NHSO₂— group is present at the o- or p-position to the hydroxy group; and when T represents the atoms necessary to complete a naphthalene ring, Ball can be bonded to either of the two rings.

8. The photographic light-sensitive sheet of claim 7, wherein said ballast group contains a hydrophobic residue having 8 to 32 carbon atoms.

9. The photographic light-sensitive sheet of claim 7, wherein said ballast group is represented by the following formula:

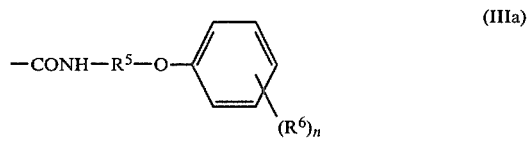

(IIIa)

—CONH—R⁵—O—R⁷ (IIIb)

—CONHR⁷ (IIIc)

—O—R⁸ (IVa)

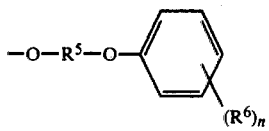 (IVb)

−O−R$^5$−CONHR$^7$ (Va)

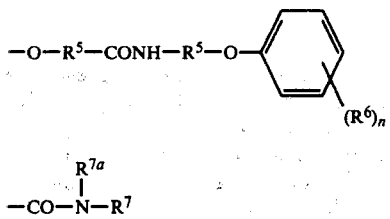 (Vb)

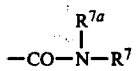 (VI)

wherein R$^5$ represents an alkylene group having 1 to 10 carbon atoms, R$^6$ represents a hydrogen atom or an alkyl group having 1 to 10 carbon atoms, n represents an integer of 1 to 5, R$^7$ represents an alkyl group having 4 to 30 carbon atoms, R$^{7a}$ represents an alkyl group having 1 to 30 carbon atoms, and R$^8$ represents an alkyl group having 8 to 30 carbon atoms or a substituted alkyl group having 8 or more carbon atoms in which the alkyl moiety has 1 or more carbon atoms.

10. The photographic light-sensitive sheet of claim 7, wherein X$^1$ represents —J—NR$^2$— or —NR$^2$—J— wherein R$^2$ represents a hydrogen atom; and J represents —SO$_2$— or —CO—; R$^1$ represents an alkyl group having 1 to 4 carbon atoms; X$^2$ represents —R$^3$—(L-)$_k$—(R$^4$)$_l$— wherein R$^3$ and R$^4$, which may be the same or different, each represents a phenylene group or a substituted phenylene group; L represents —O—, —CO—, —SO$_2$NH—, —CONH—, —NHSO$_2$—, —NHCO—, —SO$_2$— or —SO—; k represents 0 or 1; and l represents 1 when k is 1 or l represents 0 or 1 when k is 0; and i and j each represents 1.

11. The photographic light-sensitive sheet of claim 7, wherein X$^1$ represents —J—NR$^2$— or —NR$^2$—J— wherein R$^2$ represents a hydrogen atom; and J represents —SO$_2$— or —CO—; R$^1$ represents an alkyl group having 1 to 4 carbon atoms; X$^2$ represents —R$^3$—(L-)$_k$—(R$^4$)$_l$— wherein R$^3$ represents a phenylene group: R$^4$ represents a phenylene group substituted with an R$^9$—O—R$^{10}$—O— group wherein R$^9$ represents an alkyl group having 1 to 4 carbon atoms, and R$^{10}$ represents an alkylene group having 1 to 4 carbon atoms; L represents —SO$_2$NH—; k represents 1; and l represents 1; i represents 1; and j represents 1.

12. The photographic light-sensitive sheet of claim 1, wherein X$^1$ represents —CONH—; R$^1$ represents an alkyl group having 1 to 4 carbon atoms; X$^2$ represents —R$^3$—; k and l each represents 0 and R$^3$ represents a phenylene group or a substituted phenylene group; and i and j each represents 1.

13. The photographic light-sensitive sheet of claim 1, wherein the compound represented by the formula (X) is a compound of the formula (X) in which R$^{11}$ and R$^{11b}$ each represents a —CH$_2$CH$_2$— group; R$^{12a}$ and R$^{12b}$, which may be the same or different, each represents a straight chain or branched chain alkyl group having 1 to 4 carbon atoms; Q$^1$ represents a hydrogen atom or a sulfamoyl group represented by the formula —SO$_2$NR$^{13}$R$^{14}$, wherein R$^{13}$ and R$^{14}$, which may be the same or different, each represents a hydrogen atom or R$^{14a}$, wherein R$^{14a}$ represents an alkyl group having 1 to 4 carbon atoms or a substituted alkyl group having 1 to 4 carbon atoms in the alkyl moiety; and R$^{13}$ and R$^{14}$ can combine directly or through an oxygen atom to form a 5- or 6-membered ring; Q$^2$ is at the 5-position and represents a hydroxy group or an NHSO$_2$R$^{14a}$ group wherein R$^{14a}$ has the same definition as above and m represents 0 or 1.

14. The photographic light-sensitive sheet of claim 1, wherein the compound of the formula (I) is present in an amount of about 99 to about 1 mol% and said compound represented by the formula (X) is present in an amount of about 1 to 99 mol% based on the total amount of compounds of the formulae (I) and (X).

15. The photographic light-sensitive sheet of claim 1, wherein said compound of the formula (X) is present in an amount of about 99 to about 30 mol% and said compound of the formula (I) is present in an amount of about 1 to about 70 mol% based on the total amount of compounds of the formulae (I) and (X).

16. The photographic light-sensitive sheet of claim 1, wherein said compound is a dye-releasing redox compound.

17. The photographic light-sensitive sheet of claim 1, wherein said light-sensitive sheet is a diffusion transfer photographic film unit.

18. The photographic light-sensitive sheet of claim 17, wherein said film unit comprises a support, an image-receiving layer, a substantially opaque light reflecting layer and one or more light-sensitive layers having associated therewith the compound of the formula (I), a transparent cover sheet and a rupturable container having an alkaline processing composition.

19. The photographic light-sensitive sheet of claim 1, wherein said film unit comprises a support, an image-receiving layer, a substantially opaque light reflecting layer and one or more light-sensitive layers having associated therewith the compounds of the formulae (I) and (X), a transparent cover sheet and a rupturable container retaining an alkaline processing composition.

20. The photographic light-sensitive sheet of claim 3, wherein G$^1$ represents a hydrogen atom,

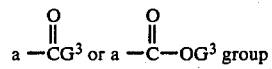

wherein G$^3$ represents an alkyl group, a halogen substituted alkyl group, or a phenyl group and G$^2$ represents

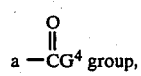

—SO$_2$G$^5$ or —SOG$^5$ wherein G$^4$ represents an alkyl group, a halogen substituted alkyl group, an alkylcarbonyl group, an alkoxy group, a substituted phenyl group, a phenyloxy group, a halogen atom, a carboxyl group, an alkoxycarbonyl group, an aryloxycarbonyl group, an alkylsulfonylethoxy group, or an arylsulfonylethoxy group, and G$^5$ represents an alkyl group or an aryl group.

21. The photographic light-sensitive sheet of claim 4, wherein G$^1$ represents a hydrogen atom,

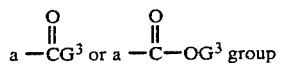

wherein $G^3$ represents an alkyl group, a halogen substituted alkyl group, or a phenyl group and $G^2$ represents a —$\overset{\overset{O}{\|}}{C}G^4$ group, —$SO_2G^5$ or —$SOG^5$ wherein $G^4$ represents an alkyl group, a halogen substituted alkyl group, an alkylcarbonyl group, an alkoxy group, a substituted phenyl group, a phenyloxy group, a halogen atom, a carboxyl group, an alkoxycarbonyl group, an aryloxycarbonyl group, an alkylsulfonylethoxy group, or an arylsulfonylethoxy group, and $G^5$ represents an alkyl group or an aryl group.

22. The photographic light-sensitive sheet of claim 5, wherein $G^1$ represents a hydrogen atom,

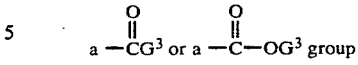

wherein $G^3$ represents an alkyl group, a halogen substituted alkyl group, or a phenyl group and $G^2$ represents

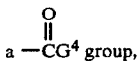

—$SO_2G^5$ or —$SOG^5$ wherein $G^4$ represents an alkyl group, a halogen substituted alkyl group, an alkylcarbonyl group, an alkoxy group, a substituted phenyl group, a phenylene group, a halogen atom, a carboxyl group, an alkoxycarbonyl group, an aryloxycarbonyl group, an alkylsulfonylethoxy group, or an arylsulfonylethoxy group, and $G^5$ represents an alkyl group or an aryl group.

* * * * *